United States Patent
Bullock

(10) Patent No.: US 6,170,587 B1
(45) Date of Patent: Jan. 9, 2001

(54) HYBRID PROPULSION SYSTEM FOR ROAD VEHICLES

(75) Inventor: Keith Joseph Bullock, Brisbane (AU)

(73) Assignee: Transport Energy Systems PTY LTD, Holland Park (AU)

(*) Notice: Under 35 U.S.C. 154(b), the term of this patent shall be extended for 0 days.

(21) Appl. No.: 09/403,264
(22) PCT Filed: Apr. 17, 1998
(86) PCT No.: PCT/AU98/00275
§ 371 Date: Oct. 15, 1999
§ 102(e) Date: Oct. 15, 1999
(87) PCT Pub. No.: WO98/47732
PCT Pub. Date: Oct. 29, 1998

(30) Foreign Application Priority Data

Apr. 18, 1997 (AU) .................................................. PO6317
Apr. 29, 1997 (AU) .................................................. PO6457

(51) Int. Cl.$^7$ ..................................................... B60K 1/02
(52) U.S. Cl. .......................... 180/69.6; 180/65.2; 180/165; 477/2
(58) Field of Search ............................ 180/65.2, 65.3, 180/65.4, 65.6, 65.8, 165, 305, 69.6; 477/2, 203; 318/45

(56) References Cited

U.S. PATENT DOCUMENTS

| | | | | |
|---|---|---|---|---|
| 2,571,284 | * | 10/1951 | Nims .................................. | 180/65.2 |
| 3,732,751 | * | 5/1973 | Berman et al. ................... | 180/65.2 X |
| 4,233,858 | * | 11/1980 | Rowlett ............................ | 180/65.2 X |
| 4,270,622 | * | 6/1981 | Travis .............................. | 180/65.4 |
| 4,441,573 | | 4/1984 | Carman et al. .............................. | 9/0 |

(List continued on next page.)

FOREIGN PATENT DOCUMENTS

| | | | |
|---|---|---|---|
| 3303448 | * | 8/1983 | (DE) . |
| 38 42 632 A1 | | 6/1990 | (DE) . |
| 41 02 882 A1 | | 8/1992 | (DE) . |
| WO 82/00270 | | 2/1982 | (WO) . |
| WO 94/10001 | | 5/1994 | (WO) . |

OTHER PUBLICATIONS

K.J. Bullock, Hybrid Vehicles, "Energy Management at the Enterprise Level. The Productivity Pormotion Council in Queensland," Paper No. 21, I.E. Aust., Sep. 1978.

K.J. Bullock and D.B. Gilmore, "An On–Road Evaluation of a 1500 kg Multi–Purpose Hybird Vehicle with Trimodal Energy Storage," XIX Int. FISITA Congress, 1982, pp. 82053–53.6.

(List continued on next page.)

* cited by examiner

Primary Examiner—Brian L. Johnson
Assistant Examiner—Bryan Fischmann
(74) Attorney, Agent, or Firm—Workman, Nydegger & Seeley

(57) ABSTRACT

A hybrid propulsion system (100) for use in road vehicle operations, which propulsion system includes a power splitting mechanical transmission (108), suitably a three shaft epicyclic gearbox (117, 118, 119), for coupling to a tailshaft (115) of the vehicle; a first drive unit (105) arranged for regenerative operation and coupled to the power splitting mechanical transmission (108); a second drive unit (110) arranged for regenerative operation and coupled, independently of said first drive unit, to the power splitting mechanical transmission (108); a non-regenerative third drive unit (113) for coupling, in parallel to said power splitting mechanical transmission, to the tailshaft; and a propulsion control system (122) for coordinating operation of the drive units in accordance with a plurality of predetermined modes corresponding to a drive cycle of the vehicle. Two forms of the invention are disclosed, being suited to non-transit and transit operations, respectively. Methods for the optimal control of the hybrid propulsion system of each form of the invention are also disclosed.

23 Claims, 13 Drawing Sheets

U.S. PATENT DOCUMENTS

| | | | |
|---|---|---|---|
| 4,597,463 | | 7/1986 | Barnard . |
| 4,813,510 | | 3/1989 | Lexen .......................................... 9/0 |
| 5,024,633 | * | 6/1991 | Schmidt . |
| 5,318,142 | | 6/1994 | Bates et al. ................................. 1/4 |
| 5,343,970 | | 9/1994 | Severinsky ................................... 6/4 |
| 5,492,189 | * | 2/1996 | Kriegler et al. ................. 180/65.6 X |
| 5,495,912 | | 3/1996 | Gray, Jr. et al. ........................... 26/0 |
| 5,562,566 | | 10/1996 | Yang ........................................... 1/2 |
| 5,571,058 | | 11/1996 | Schmidt ..................................... 17/4 |
| 5,603,671 | * | 2/1997 | Schmidt .......................... 180/65.4 X |
| 5,823,281 | * | 10/1998 | Yamaguchi et al. ............... 180/65.2 |

OTHER PUBLICATIONS

Gilmore, Bullock, Webb, and Vint, "Fuel Efficient Internal Combustion Engine–Electric Urban Transport Vehicles," ISATA, Milan, Italy, Sep. 24–28, 1984.

K.J. Bullock and M.K. Vlint, "Hybird Transit Bus Power and Energy Requirements," EVS–11, Florence, Sep. 1992.

K.J. Bullock and P.G. Hollis, "Implementation of Gasoline Electric Hybird Vehicle Technology at the University of Queensland," Paper E1079, ISATA, Aachen, Sep. 13–17, 1993.

HYBRID PROPULSION SYSTEM FOR ROAD VEHICLES

FIELD OF THE INVENTION

This invention relates to motive power systems for use in propelling vehicles. The invention particularly relates to motive power systems which include an arrangement of two or more power units coupled to a transmission, commonly termed "hybrid" propulsion systems, for road vehicles such as omnibuses.

BACKGROUND TO THE INVENTION

Road vehicles, especially omnibuses, are used for a variety of different types of operations, which may be conveniently categorised as follows:

(a) central business district (CBD) or local school operations, typically travelling up to 100 km/day;

(b) commercial non-transit operations, typically travelling around 120 km/day;

(c) suburban transit operations, typically travelling from 100 to 200 km/day; and (d) long distance transit operations, typically travelling 400 km or more each day.

Table 1 (overpage) sets out some typical operating parameters for each of these categories. The parameters include the average number of stops likely to be made by the omnibus per kilometre, the hours of operation per day, the opportunities available to replenish the battery energy source, if used, the relative requirement for smooth vehicle operations, the relative importance of energy regeneration and transmission efficiency, and the number of passenger seats. It will be appreciated from the following parameters, that a wide variety of road load environments are encountered during omnibus operations. Such road load environments call for significant flexibility in specifying propulsion systems for these vehicles.

For the purposes of the specification, categories (a) and (b) will be hereinafter collectively referred to as "non-transit" operations, whilst categories (c) and (d) will be hereinafter collectively referred to as "transit" operations. Conventional omnibuses are generally propelled by a relatively high powered compression ignition engine fuelled by diesel. In some cases, typically for non-transit operations, omnibuses may be propelled by electric motors supplied from storage batteries.

TABLE 1

Typical parameters for vehicle operating categories

| | CBD | Commercial non-transit | School | Transit Short haul | Transit Long haul |
|---|---|---|---|---|---|
| Average speed (km/h) | 12–15 | 15–20 | 20 | 12–20 | 25–35 |
| Distance (km/day) | 100 | 120 | 2 × 35 | 120–200 | 400 |
| Stops/km | 3–4 | 3 | 2–3 | 2 | 1–2 |
| Hours/day | 8 | 14 | 2 × 2 | 10 | 16 |
| Daytime battery charging - | | | | | |
| * Opportunity | No | Several | One | No | No |
| * Fast | Yes | Yes | No | Yes | No |

TABLE 1-continued

Typical parameters for vehicle operating categories

| | CBD | Commercial non-transit | School | Transit Short haul | Transit Long haul |
|---|---|---|---|---|---|
| Smooth operation | Essential | Important Essential | Not | Important Essential | Not |
| Regenerative | Very Imp. | Important | Very Important | Important | Not Important |
| Transmission efficiency | Very Important | Very Important | Important | Important | Important |
| Seats | 30–45 | 20–30 | 45–50 | 30–45 | 45 |

The problems and drawbacks with these propulsion units include, in the case of compression ignition engines, high noise levels, environmental pollution and high fuel consumption resulting from operating at part load or idle for long periods. Omnibuses for transit operations are traditionally powered by diesel engines with power outputs in the range of 140 to 185 kW and typically the engine and transmission have a combined mass of 500 to 800 kg. The engine is usually coupled to an automatic transmission with 4 or 5 gears, with more recent variants including a lock-up torque converter in the top two gears. A half loaded 12 metre omnibus travelling at 60 km/h has approximately 1.8 MJ of energy, this is equivalent to 100 kW of continuous power available for absorption during a relatively slow stop of 18 seconds and 150 kW for a more usual stopping time of 12 seconds. This energy, which might otherwise be recovered, is merely dissipated through friction braking and/or engine retardation braking in prior art propulsion systems. The opportunity for energy recovery also exists during downhill running situations with this potential energy, also normally dissipated in conventional propulsion systems.

The average level road power requirement for CBD operations in dense traffic is about 1.8 kW/t and about 3 kW/t when moving with a velocity in excess of 5 km/h. This power consumption for a full sized bus results in power demands of 25 kW and 40 kW, respectively. This is well below the maximum power demand which, for a 15 tonne omnibus, is of the order of 150 kW. Braking losses are particularly significant during CBD operations, where up to four stops per kilometre are common. There are also noise and air pollution problems attendant with the use of diesel fuel, such as the production of soot which some health authorities state is carcinogenic.

In transit operations, there is generally a high peak:average power ratio which has customarily led to the specification of diesel engine for such applications, because of this engine's combination of constant compression ratio and low pumping losses at all torque levels. These characteristics of compression ignition engines are in sharp contrast to spark ignition engines wherein power output is controlled by throttling the engine intake fluid, thereby reducing the compression pressure (and hence the maximum combustion pressure and the efficiency of the combustion process) as well as incurring increased pumping losses.

Turning to conventional electric vehicles, a significant problem is the low energy density of standard batteries, such as the lead acid type, along with the relatively high capital cost of suitable power electronic systems for implementing regenerative operations. Furthermore, reduced vehicle performance is experienced as the batteries approach a low state of charge. Traction batteries typically possess an energy density of about 100 kJ/kg at a 3 hour rate of discharge, but only about 50 kJ/kg at a 30 minute rate of discharge.

Conventionally battery packs in electric vehicles constitute up to 30% of the vehicle mass.

It is extremely difficult to transfer more than 70% of vehicle kinetic energy back into a battery pack of the above mentioned mass. For example, if a vehicle was braked from 60 km/h for 10 to 12 seconds, the electric machine and electronic system would need to deliver 50 W/kg to the battery at an efficiency of perhaps 80% for the electric machine and 85% for the battery, resulting in an overall efficiency of 68%. When braking from higher speeds the efficiencies are worse. Thus an electric drive is not really suited to stop-start operations. Furthermore, the electric machine has to have a sufficiently high power rating in order to be compatible with normal traffic, which requires peak powers of around 15 kW/t of vehicle mass. For example an AC machine rated at 180 kW for powering an omnibus has large losses when delivering the average level road power of 40 kW.

The prior art is replete with examples of hybrid propulsion systems for vehicles wherein a combustion engine and an electrical machine, operating as a motor, are used as propulsion units. U.S. Pat. No. 5,343,970 (Severinsky) describes a typical hybrid arrangement wherein an AC induction motor drives the vehicle at low speeds or in traffic, whilst an internal combustion engine drives the vehicle in highway cruising. The electric machine is supplied by a bidirectional AC/DC power converter and is operable as a generator to charge storage batteries, during braking or from the engine. Both propulsion units may together drive the vehicle during acceleration or hill climbing situations. The Severinsky arrangement is an example of a "parallel hybrid" system wherein the propulsion units can each provide power via a torque sharing device coupled directly to a vehicle's final drive. The specification also includes a useful review of prior art propulsion systems. U.S. Pat. No. 5,562,566 (Yang) is another example of a hybrid propulsion system of this type.

U.S. Pat. No. 5,318,142 (Bates et al.) is an example of a "series hybrid" wherein only one propulsion unit supplies torque directly to the final drive. A further example is disclosed in U.S. Pat. No. 5,515,937 (Adler et al.), which happens to employ individual motors at each wheel in the final drive. As set out in Severinsky the cost, weight and inefficiency limit the performance of series hybrid type propulsion systems.

There also exist hybrid propulsion systems which employ subsidiary energy storage systems, other than the ubiquitous electric machine and battery combination, to recover energy normally dissipated during braking or downhill running situations for re-use in accelerating and driving the vehicle. U.S. Pat. No. 4,441,573 (Carmen et al.) describes an engine and hydraulic machine in a parallel hybrid arrangement, including an internal combustion engine and a variable displacement hydraulic pump/motor coupled, in one form, by a power splitting planetary gear assembly to the final drive. The hydraulic pump/motor is supplied by a series of high pressure hydraulic accumulators for storing fluid pressure, transferred to them during regenerative pumping or supplied from them during propulsive motoring of the hydraulic machines. A further example of this configuration is disclosed in U.S. Pat. No. 4,813,510 (Lexen) which is designed for vehicles conducting non-transit type start-stop operations, such as CBD buses.

Carmen also observes that flywheels may also be used as a subsidiary storage system either in substitution for, or in combination with, a hydraulic accumulator. There is, however, no discussion of how the latter might be put into practical effect. The '573 specification also contains a useful review of the prior art relating to flywheels and hydraulic accumulators in the field of hybrid propulsion systems.

U.S. Pat. No. 5,492,189 (Kriegler et al.) describes a hybrid propulsion system which includes an internal combustion engine operating in a steady state mode and a driving engine operating in a transient mode, which act on the output shaft of a planetary gear train. The two transient engines may be configured as hydraulic machines or electric machines whereby power flow between the hydraulic or electric machines, and an associated energy storage unit, is controlled by a suitable control unit.

Similarly, U.S. Pat. No. 5,495,912 (Gray, Jr. et al.) describes a hybrid power train including a small internal combustion engine which may be coupled to a continuously variable transmission (CVT) and/or to a hydraulic machine, the torque of which machine is reversible so as to act as either a pump or a motor. Gray indicates that a secondary engine, for example another internal combustion engine, might be clutched to the first I.C. engine to provide additional power for repeated acceleration or ascending long grades when the hydraulic accumulator supplying the hydraulic machine is depleted. In a further example, the second engine comprises another hydraulic machine which is broadly similar to the Kriegler configuration.

Whilst it is apparent from the above discussion that hybrid propulsion systems using a combination of combustion engine and electric machine/battery or a combination of combustion engine and hydraulic machine/ accumulator and/or flywheel are known, the combination of electric machine and hydraulic machine/accumulator is much less often employed in practice. A hydraulic propulsion unit employing a nitrogen oil accumulator operating at 345 bar exhibits an energy density of about 1.5 kJ/kg and allows a relatively high rate of energy transfer, both to and from the accumulator. However, high power levels require large hydraulic machines which are conventionally clutched out of service when not needed for propulsion or retardation.

A hydraulic drive unit employing a hydrostatic pump/ motor and accumulator also has an excellent characteristic for regenerative braking as the torque rises with the pressure in the accumulator and hence at zero speed the hydrostatic system, if the accumulator is fully charged, has maximum torque capability. However, the oil nitrogen accumulators need to be relatively large and a pressure ratio between the maximum and minimum pressure of approximately 3:1 means that as the accumulator is drained of its oil, the pressure is reduced to one third, which means that the torque and hence power capability of the hydrostatic machine at speed is considerably less than at its maximum possible operating point.

A large 15 tonne omnibus could easily be fitted with a 355 cc hydraulic machine with a maximum motoring power of 400 kW or a torque of 1950 Nm when directly connected to the final drive. The torque is about 2.5 times the maximum torque of similarly rated diesel engine. If the machine were not clutched out of service when not required, the drag at zero pressure differential and zero oil flow is equivalent to a 9% increase in the drag of the omnibus. This loss is unacceptable for an omnibus with a hybrid electric/hydraulic propulsion system required to operate in transit mode over a medium distance.

A further restriction on the use of accumulators is the high energy loss if the energy is put in adiabatically, with a polytropic index of up to 1.6 for a 100 to 345 bar rapid compression in 15 seconds. Where a hybrid propulsion system relies on a full accumulator charge during low speed high rate acceleration from zero speed, the pressure drop due to cooling of the gas necessitates a small energy addition to accumulators with power levels of the order 3 kW when the vehicle is stationary. This energy addition should be the normal method of utilisation of accumulators in hybrid systems and is of utmost importance in electric powered vehicles. Accordingly the necessary energy addition is likely to be a major factor for their present non-use in electric hybrid vehicles.

The kinetic energy at 80 km/hr, the normal maximum speed for 12 tonne transit omnibuses, is approximately 2.9 MJ. This kinetic energy minus the drag energy has to be stored at rates of approximately 200 kW for the 10 seconds required for a very rapid stop if full regeneration of energy is required. However, the actual acceleration requirements are somewhat less, being spread over 15 to 20 seconds, requiring a very large wheel torque in the speed range up to 30 km/hr.

A flywheel is an ideal source and sink of transient energy since kinetic energy, of the order mentioned above, can be stored in a steel flywheel operating at normal maximum speeds of automotive systems, typically 5000 to 6000 rpm. However, to utilise a flywheel over the speed range of a bus normally requires a continuously variable transmission. Generally, this is difficult to achieve since there is a large speed mismatch between the flywheel and the vehicle, as the flywheel should be at maximum speed when the vehicle is stationary and vice versa. If electric machines are used to produce a continuously variable transmission (CVT), ie. if one electric machine is mechanically coupled to the flywheel, another electric machine is mechanically coupled to the drive shaft and both machines are connected electrically, the motor connected to the drive shaft has to be relatively large to produce the low speed high torque required for an omnibus. An AC machine, such as an induction motor, is typically directly coupled for energising the flywheel. Although the AC machine may be considerably smaller than the main drive motor, induction machines have poor power capability at high speeds. Accordingly a large expensive AC machine is generally required. Such machines have high eddy current and hysteresis losses at high frequency, where most of the kinetic energy is stored.

A further species of hybrid propulsion systems, are those which employ three or more different types of propulsion unit in order to meet highly variable road load conditions, whilst attempting to maximise efficiency. German Patent Application No. 3842632 (MAN Nutzfahrzeuge AG) describes a system including an internal combustion engine and a pair of hydraulic motors coupled to a planetary transmission, along with an electrical machine which is clutched to a flywheel. The electrical machine is operable as a motor supplied from a storage battery and as a generator for charging the battery. The system described relies on the battery and (presumably) a fluid fuel tank for storing energy but does not include any fluid pressure storage means.

The propulsion units described in the MAN specification are connected to a very complicated epicyclic gearbox through which each unit transfers all its power to the final drive. This arrangement has several inherent operational drawbacks, including the requirement for relatively large hydraulic and electric machines in order to deliver sufficient torque, particularly when accelerating the omnibus. In one mode of operation the engine drives a first hydraulic machine as a pump which transmits power (via the interconnecting hydraulic circuit) to the second machine which acts as a motor to drive the tail shaft. There are considerable losses associated with the clutching of the first hydraulic machine between different gears in the gearbox. As engine load levelling at cruise is obtained by charging and discharging the battery, power transfer from the engine is likely to be inefficient because the hydraulic machine transmits from 30% to 50% of the total power.

Thus existing hybrid propulsion systems suffer from a number of drawbacks and disadvantages in vehicle and particularly omnibus operations. The wide variety of prior art attempts to address these problems combined with the relative absence of such systems in volume commercial production is itself indicative of the failure to identify a satisfactory solution.

OBJECT OF THE INVENTION

It is an object of the present invention to provide a hybrid propulsion system for a road vehicle which ameliorates or overcomes at least some of the problems associated with the prior art.

It is a preferred object of the invention to provide a hybrid propulsion system which is suited for use in non-transit omnibus operations.

It is a another preferred object of the invention to provide a hybrid propulsion system which is suited for use in transit omnibus operations.

It is a yet another preferred object of the invention to provide a method for controlling a hybrid propulsion system which seeks to maximise the efficiency of operation of each propulsion unit in the system.

Further objects will be evident from the following description.

DISCLOSURE OF THE INVENTION

The invention broadly resides in a hybrid propulsion system for use in vehicle operations, said propulsion system comprising:
- (a) a power splitting mechanical transmission for coupling to a final drive of the vehicle;
- (b) a first drive unit arranged for regenerative operation and coupled to the power splitting mechanical transmission;
- (c) a second drive unit arranged for regenerative operation and coupled, independently of said first drive unit, to the power splitting mechanical transmission;
- (d) a non-regenerative third drive unit arranged in parallel to said power splitting mechanical transmission, to the final drive; and
- (e) propulsion control means, for coordinating operation of the drive units in accordance with a plurality of predetermined modes corresponding to a driving cycle of said vehicle; wherein each of the first, second and third drive units includes a different type of energy storage means.

Preferably the power splitting mechanical transmission includes an epicyclic gearbox having a ring gear on a first shaft, a sun gear on a second shaft and a planetary gear carrier assembly on a third shaft.

Suitably, when the propulsion system is configured for non-transit vehicle operations:
- (a) the ring gear of the epicyclic gearbox is arranged for coupling to the tailshaft;
- (b) the first drive unit is coupled to the sun gear of the epicyclic gearbox;
- (c) the second drive unit is coupled to the planetary gear carrier assembly of the epicyclic gearbox; and (d) the third drive unit is coupled to the tailshaft via a speed changing transmission; whereby the epicyclic gearbox delivers torque to the tailshaft for propelling the vehicle or receives torque from the tailshaft for retarding the vehicle.

Most preferably, when the propulsion system is configured for non-transit vehicle operations:

the first drive unit includes an electrical energy storage means and an associated electrical energy conversion means;

the second drive unit includes a fluid pressure storage means and an associated fluid pressure energy conversion means; and the third drive unit includes a chemical energy storage means and an associated combustion engine.

In preference the predetermined modes of operation coordinated by the propulsion control means include:

(i) an acceleration mode, wherein the fluid pressure energy conversion means or the electrical energy conversion means supplies power to the tailshaft, supplemented by power from the combustion engine as required;

(ii) a cruise mode, wherein the electrical energy conversion means supplies power to the tailshaft, supplemented by power from the combustion engine as required;

(iii) a deceleration mode, wherein each of the fluid pressure energy conversion means and the electrical energy conversion means are operated regeneratively to recover power from the tailshaft and supply, respectively, the fluid pressure storage means and the electrical energy storage means; or (iv) a stationary mode, wherein a selected drive unit supplies power for replenishing the fluid pressure storage means and/or the electrical energy storage means as required.

Suitably, when the propulsion system is configured for transit vehicle operations:

(a) the planetary gear carrier assembly of the epicyclic gearbox is arranged for coupling to the tailshaft;

(b) the first drive unit is coupled to the ring gear of the epicyclic gearbox;

(c) the second drive unit is coupled to the sun gear of the epicyclic gearbox; and (d) the third drive unit is coupled to the tailshaft via a speed changing transmission; whereby the epicyclic gearbox delivers torque to the tailshaft for propelling the vehicle or receives torque from the tailshaft for retarding the vehicle.

In one form, wherein the propulsion system is configured for transit vehicle operations:

the first drive unit includes a fluid pressure storage means and an associated fluid pressure energy conversion means;

the second drive unit includes a mechanical energy storage means; and the third drive unit includes a chemical energy storage means and an associated combustion engine.

If required a fourth drive unit arranged for regenerative operation, including a second fluid pressure energy conversion means associated with the fluid pressure storage means, is coupled to the planetary gear carrier assembly.

In the first form, the predetermined modes coordinated by the propulsion control means include:

(i) an acceleration mode, wherein the mechanical energy storage means supplies power to the tailshaft, controlled by power either supplied to or sourced from the fluid pressure energy conversion means and supplemented by power from the combustion engine as required;

(ii) a cruise mode, wherein the combustion engine supplies power to the tailshaft, supplemented by power from the mechanical energy storage means controlled by the fluid pressure energy conversion means as required;

(iii) a deceleration mode, wherein fluid pressure energy conversion means is operated to control regeneration of power from the tailshaft to supply either the mechanical energy storage means or the fluid pressure storage means; and (iv) a stationary mode, wherein a selected drive unit (normally the combustion engine) supplies power for replenishing the mechanical energy storage means and/or the fluid pressure storage means as required.

In another form, when the propulsion system is configured for transit vehicle operations:

the first drive unit includes an electrical energy storage means and an associated electrical energy conversion means;

the second drive unit includes a mechanical energy storage means; and the third drive unit includes a chemical energy storage means and an associated combustion engine.

If required, a fourth drive unit is coupled to the planetary gear carrier assembly, which fourth drive unit includes a second electrical energy conversion means associated with the electrical energy storage means.

In the other form, the predetermined modes coordinated by the propulsion control means include:

(i) an acceleration mode, wherein the mechanical energy storage means supplies power to the tailshaft, controlled by power either supplied to or sourced from the electrical energy conversion means and supplemented by power from the combustion engine as required;

(ii) a cruise mode, wherein the combustion engine supplies power to the tailshaft, supplemented by power from the mechanical energy storage means controlled by the electrical energy conversion means as required;

(iii) a deceleration mode, wherein electrical energy conversion means is operated to control regeneration of power from the tailshaft to supply either the electrical energy storage means or the mechanical energy storage means; and (iv) a stationary mode, wherein a selected drive unit (normally the combustion engine) supplies power for replenishing the mechanical energy storage means and/or the electrical energy storage means as required.

Preferably the fluid pressure storage means comprises a hydrostatic storage means, such as an oil-nitrogen accumulator, and the fluid pressure energy conversion means comprises at least one hydraulic machine, such as a hydrostatic pump/motor.

If required, the fluid pressure energy conversion means may further include an auxiliary hydrostatic machine coupled to the combustion engine.

Preferably the electrical energy storage means comprises an electro-chemical storage means, such as a battery pack, and the electrical energy conversion means comprises a rotary electric machine, such as a DC motor or an AC machine.

If required the electrical energy storage means may include at least one electrostatic storage means, such as a super capacitor.

Preferably the electrical energy conversion means further includes a solid state power converter, such as a DC-DC motor controller or DC-AC four-quadrant inverter.

If required, the electrical energy conversion means may further include an auxiliary electric machine coupled to the combustion engine.

Preferably the mechanical energy storage means includes a kinetic energy storage means, including at least one flywheel.

Preferably the chemical energy storage means comprises one or more fluid fuel storage tanks, and the combustion engine is a spark or compression ignition internal combustion engine.

At least one shaft of the three shaft epicyclic gearbox may be coupled to a brake means.

Suitably the speed changing transmission may include a clutch and a hydrodynamic torque converter.

Alternatively, the speed changing transmission may include an automatic gearbox with a hydrodynamic torque converter.

Suitably the hydrodynamic torque converter for the speed changing transmission is of the lockup type.

Preferably the propulsion control means comprises a microcontroller interfaced to a series of status transducers and a series of control means associated with respective components of the propulsion system.

Preferably the microcontroller includes memory means for storing therein signals received from the status transducers associated with each drive unit, which status signals are indicative of the operational state of respective drive units, and which memory means also stores corresponding command signals applied to the control means for the drive units; whereby the stored status signals and command signals are utilised for deterministic or adaptive control of the hybrid propulsion system.

The invention also broadly resides in a method for controlling a hybrid propulsion system for a vehicle, which propulsion system includes at least two drive units arranged for regenerative operation and coupled to a power splitting mechanical transmission independently of each other, which mechanical transmission is coupled in parallel with a non-regenerative third drive unit to a final drive of the vehicle, said method including the steps of:

determining current state of the propulsion system by monitoring status of each drive unit, including respective operating speeds and energy storage levels;

receiving a demand signal indicative of desired vehicle motion; and if the demand signal indicates that negative wheel power for braking the vehicle is desired:
    operating any of the regenerative drive units regeneratively in accordance with current system state; or if the demand signal indicates that positive wheel power for cruise or acceleration is desired:
    operating one or more of the drive units propulsively in accordance with current system state; or if the demand signal indicates that no wheel power is desired, the vehicle being stationary:
    operating selected ones of the drive units for replenishing energy storage means associated with the regenerative drive units;

which steps are repeatedly iterated in order to control the propulsion system with an optimum trajectory to a desired system state indicated by the demand signal.

BRIEF DETAILS OF THE DRAWINGS

To assist in understanding the invention preferred embodiments will now be described with reference to the following figures in which.

Figure 5A:
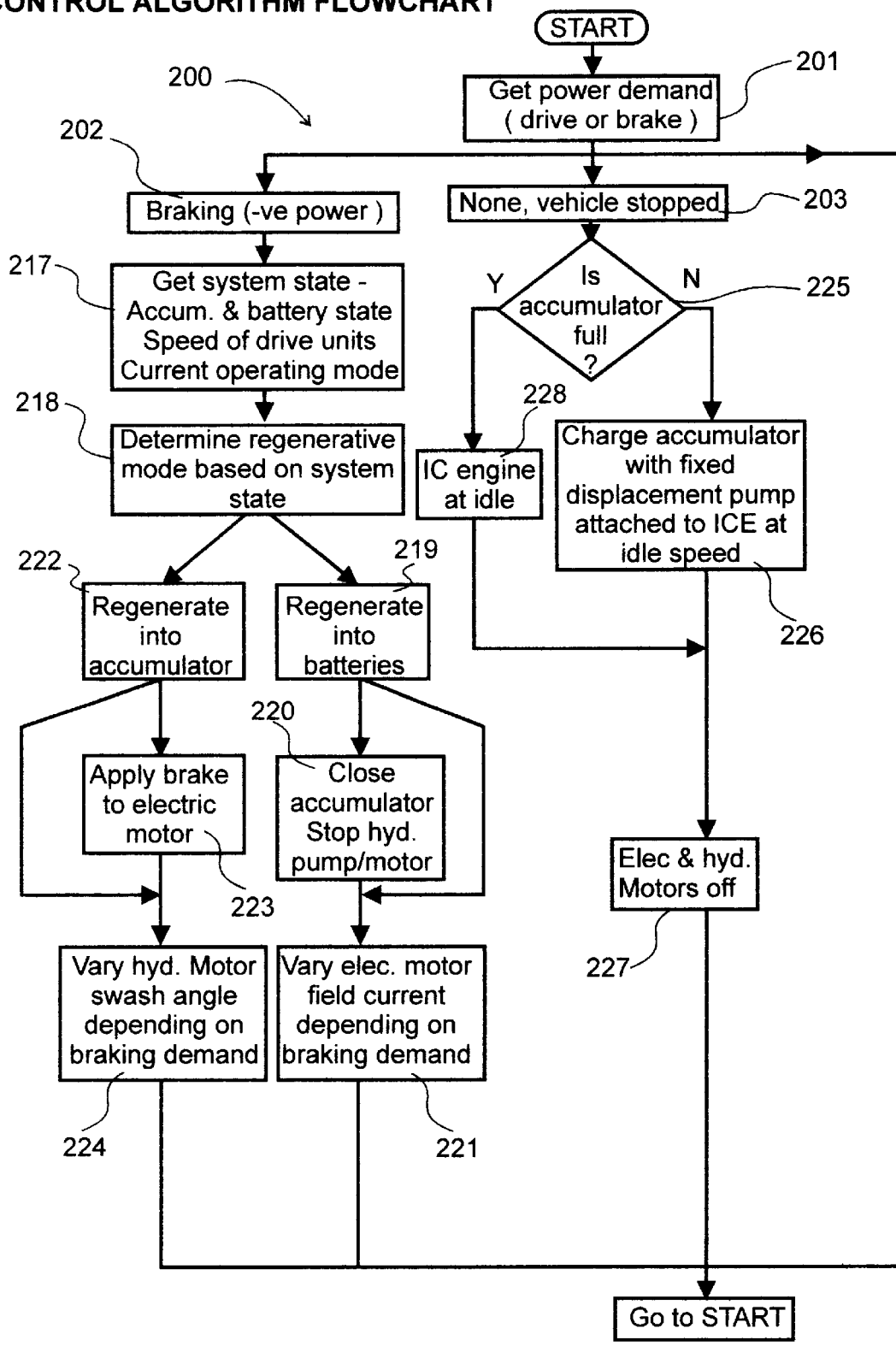
Figure 5B:
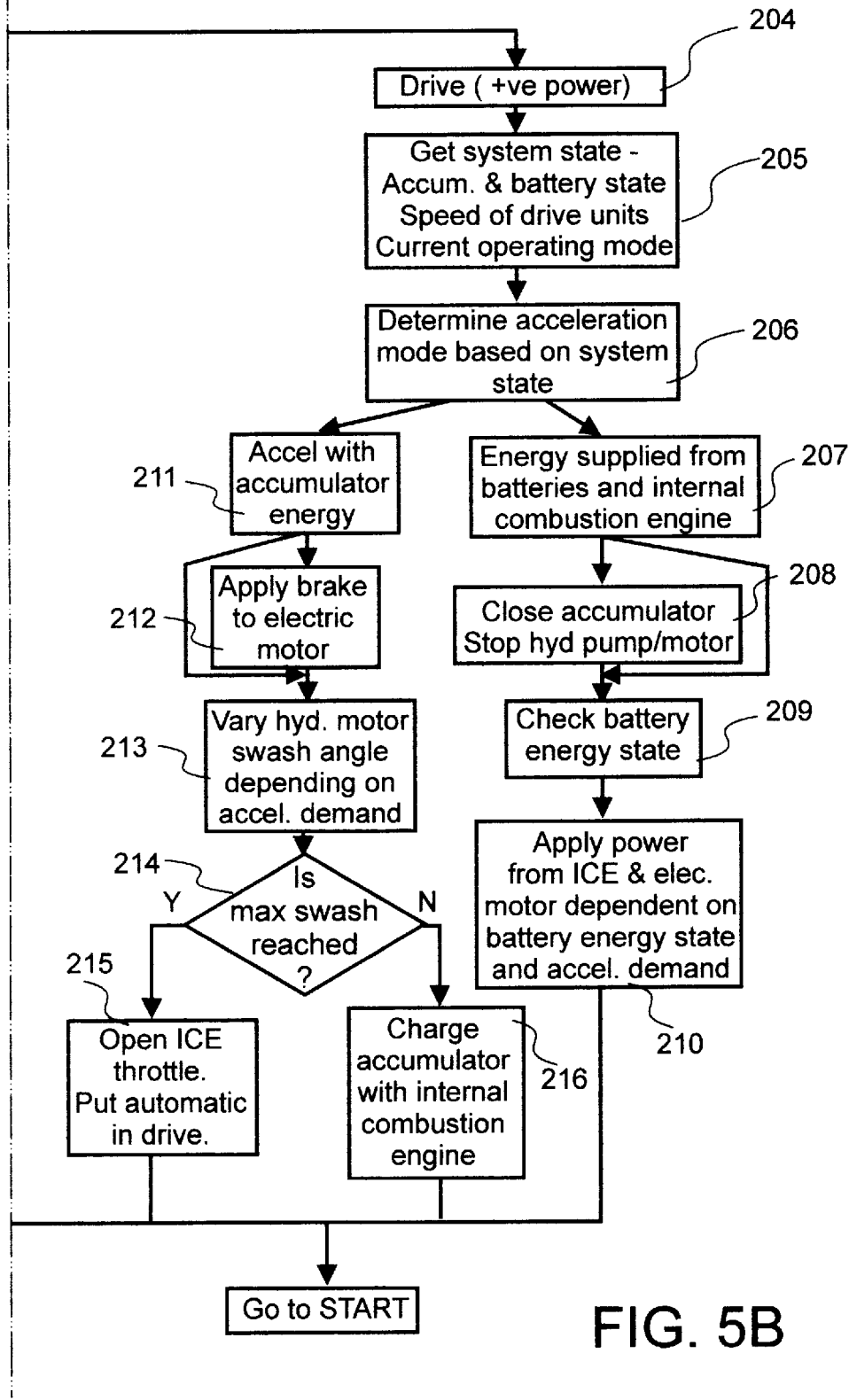
Figure 6:
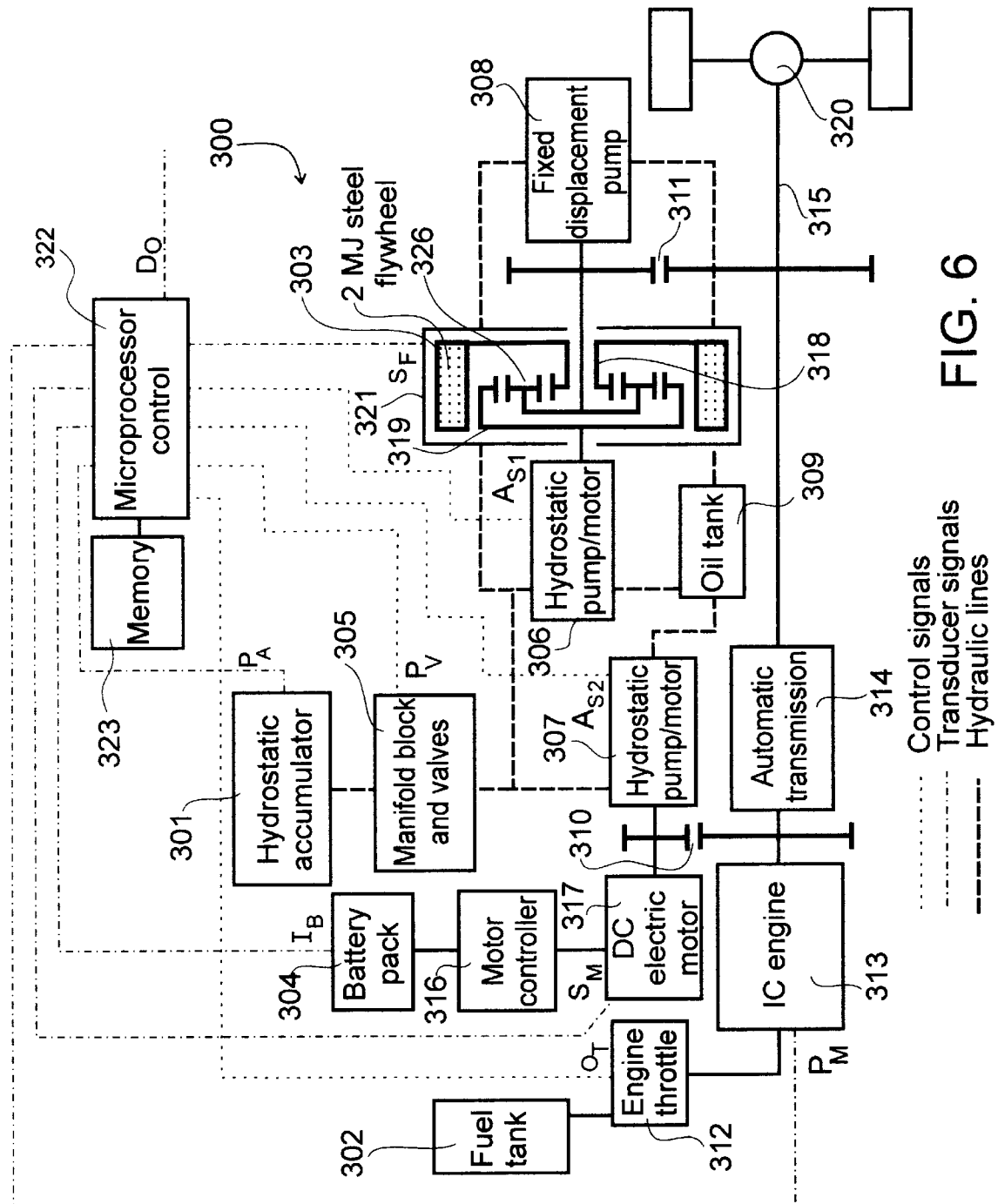
Figure 7:
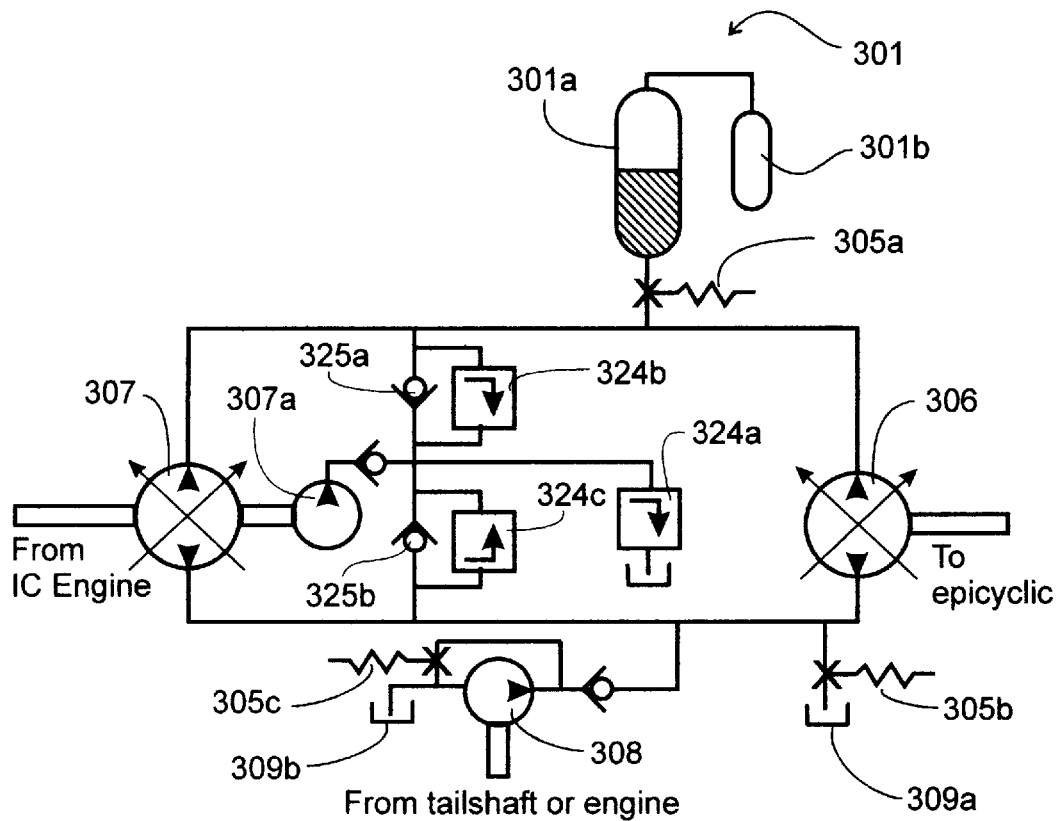
Figure 8:
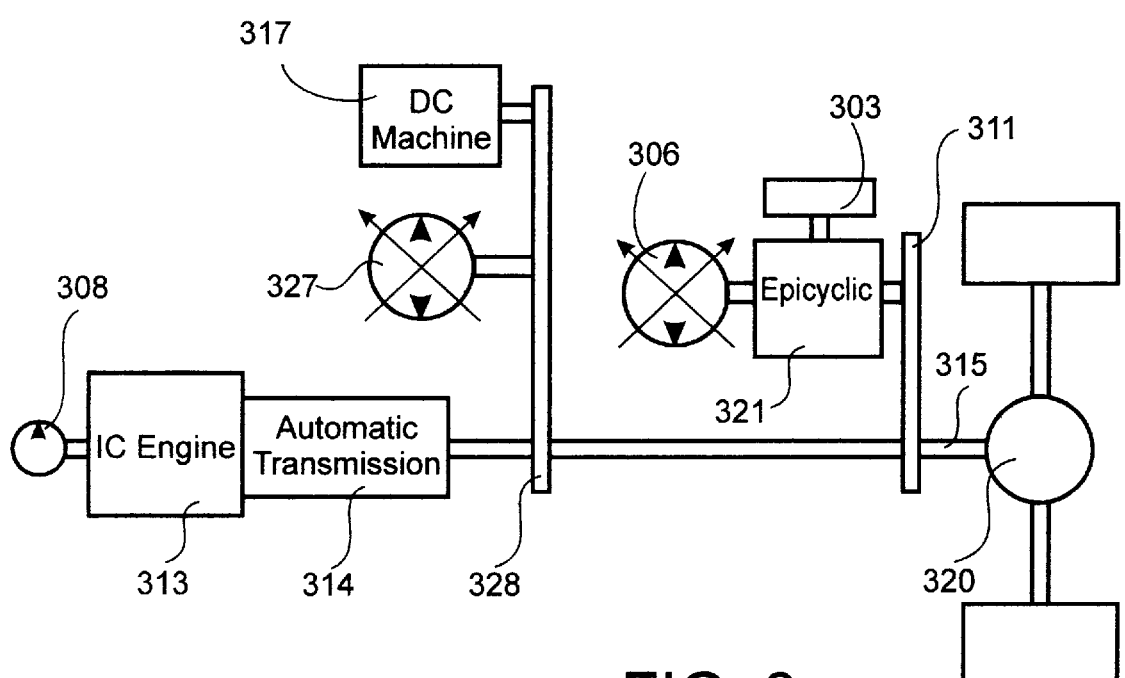
Figure 9:
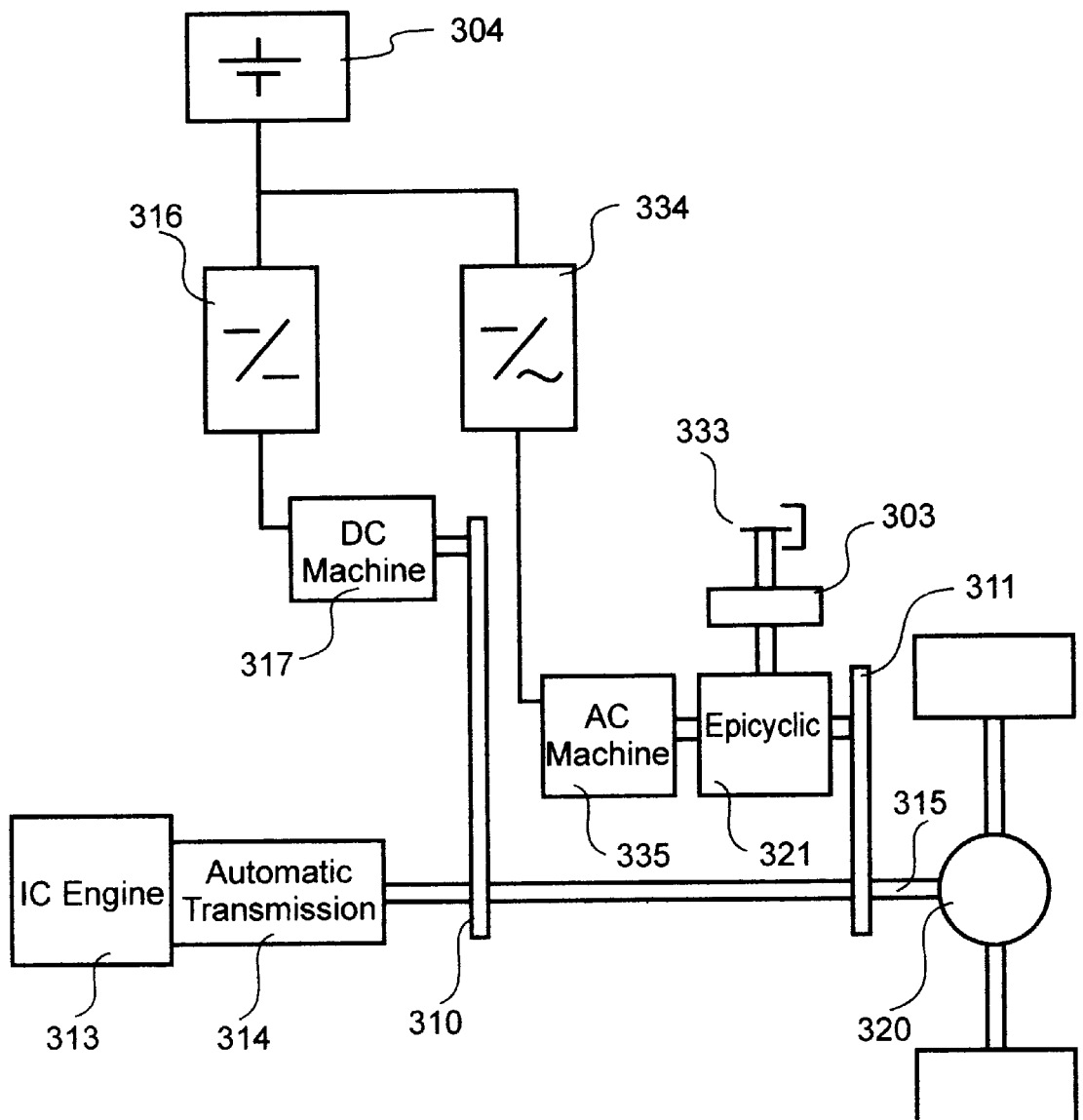
Figure 10:
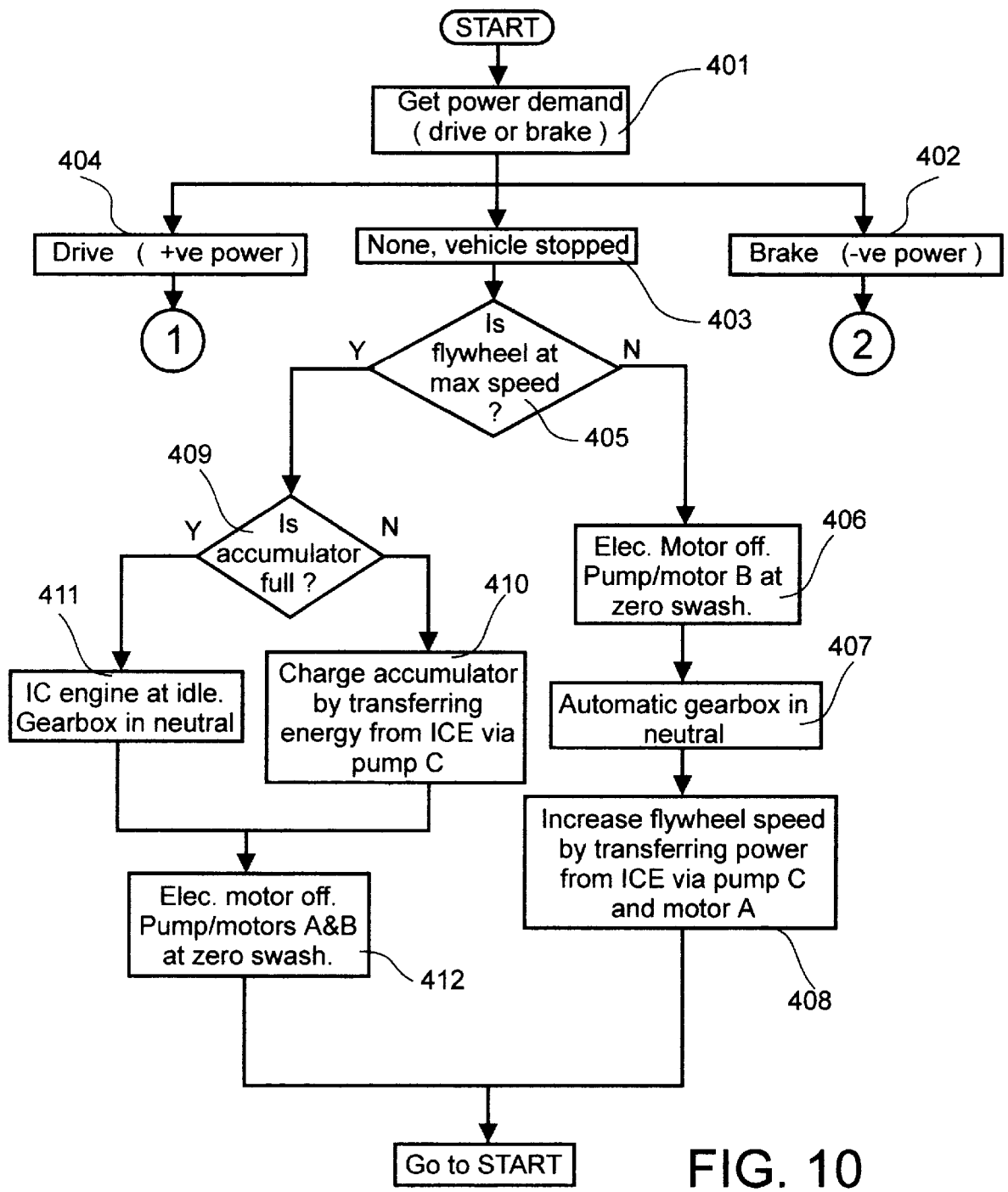
Figure 11A:
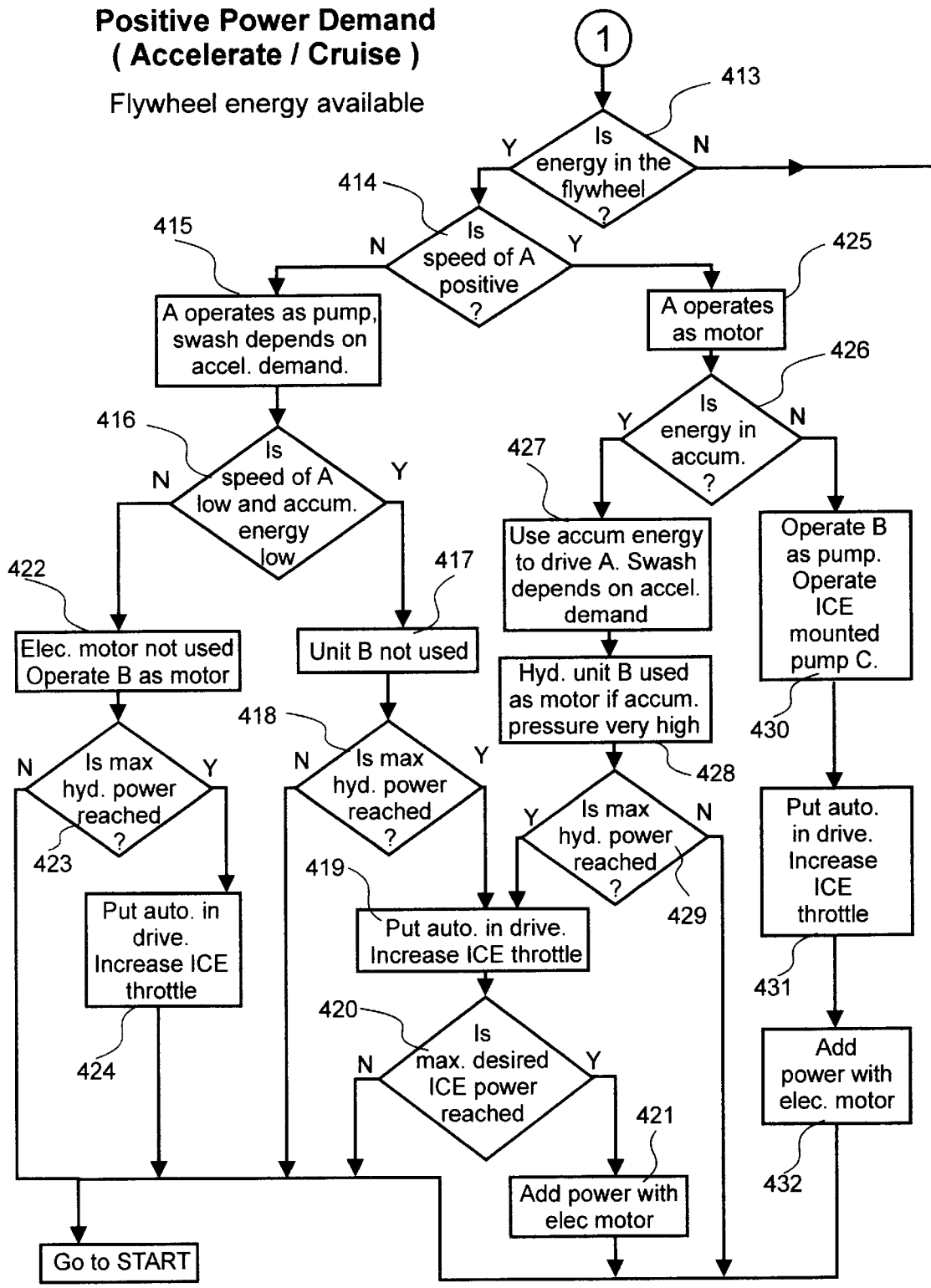
Figure 11B:
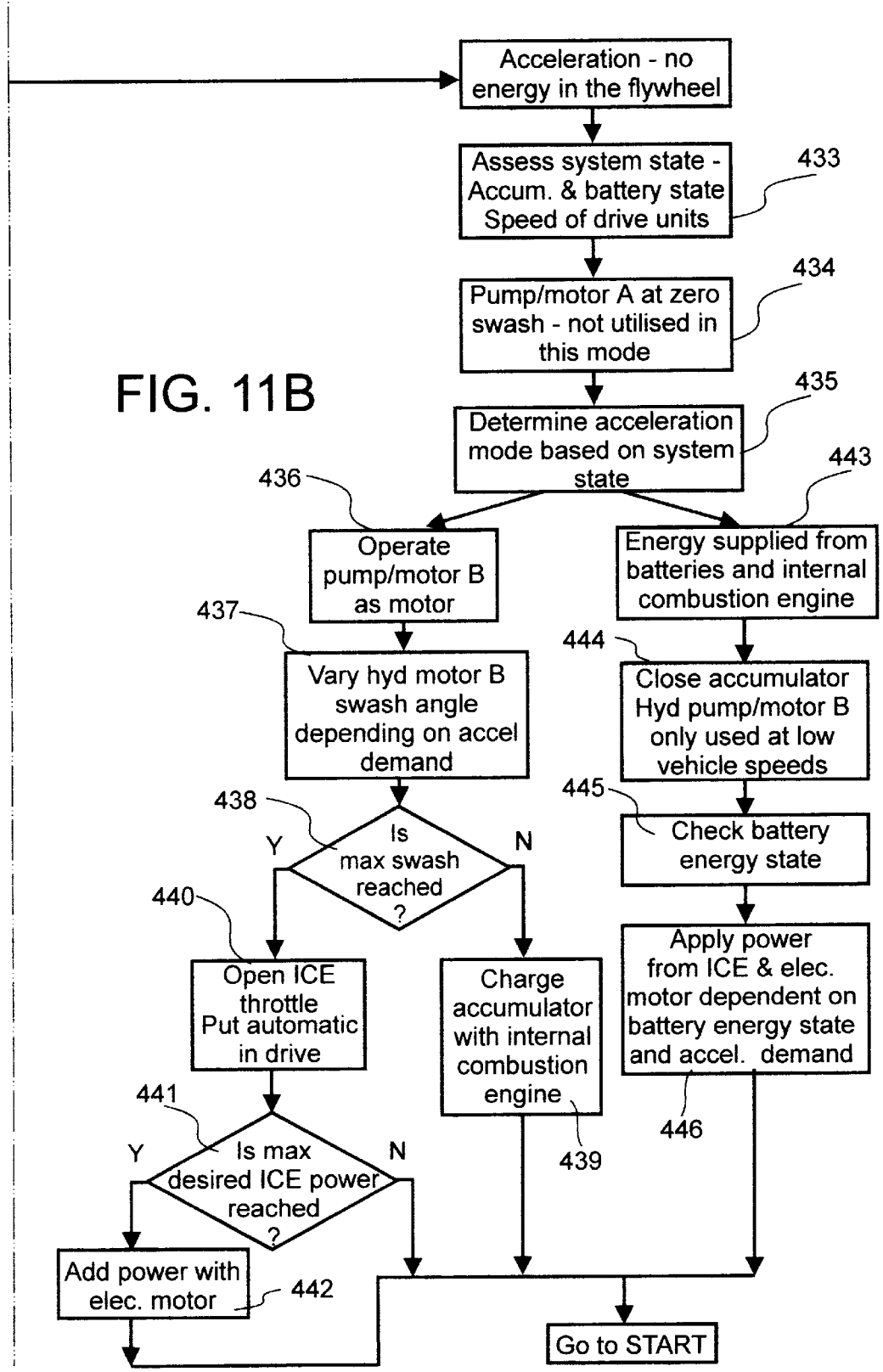
Figure 12:
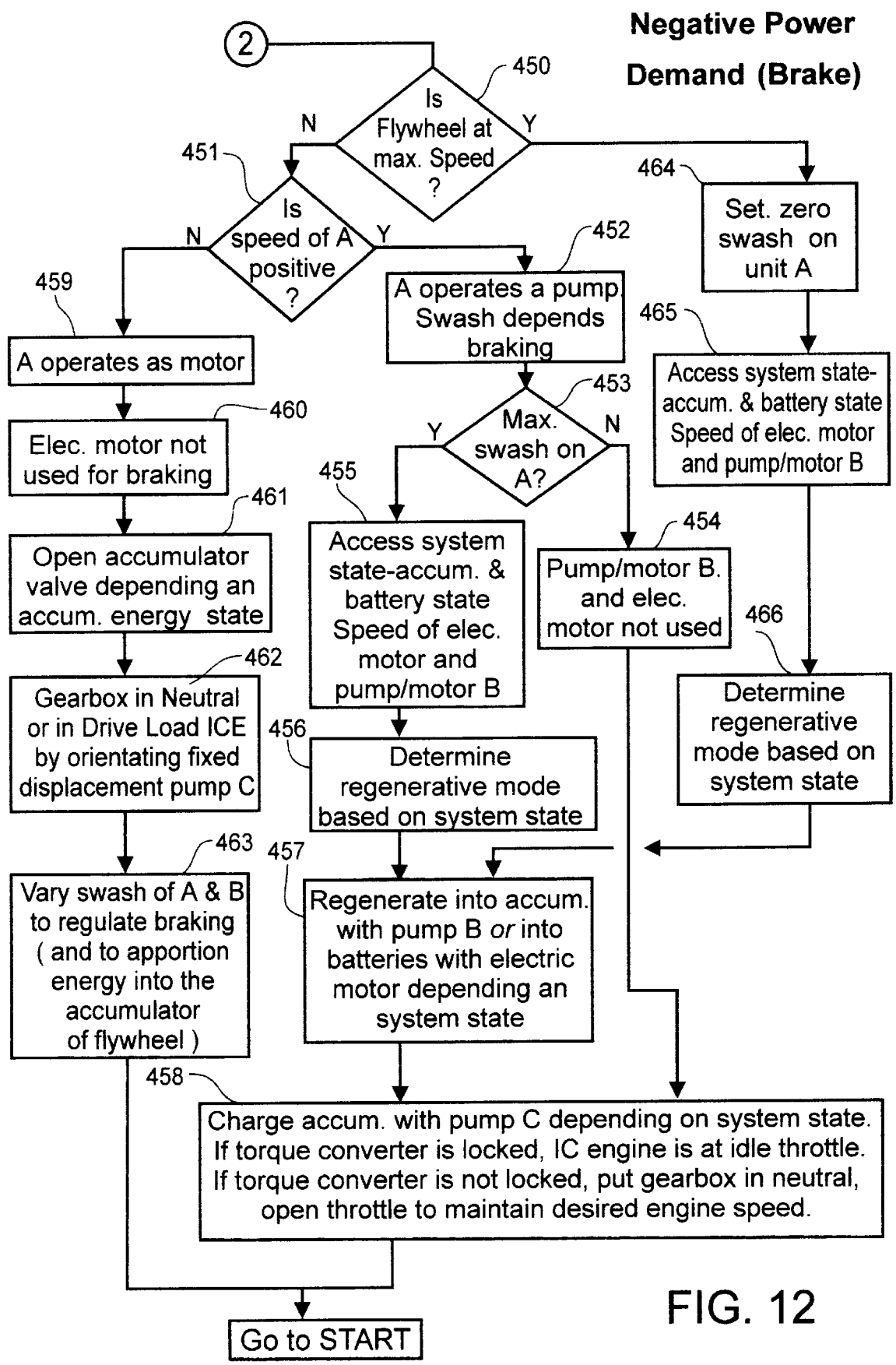

FIGS. 5A and 5B together show a flowchart of a control algorithm for use in relation to the hybrid propulsion system of the first form of the invention;

FIG. 6 is a block diagram of a hybrid propulsion system of an embodiment of a second form of the invention suitable for transit type omnibus operations;

FIG. 7 is a schematic diagram of a fluid drive unit for the first hybrid propulsion system;

FIG. 8 is a diagram of a hybrid propulsion system of a second embodiment of the second form of the invention;

FIG. 9 is a diagram of a hybrid propulsion system of a third embodiment of the second form of the invention;

FIG. 10 is a flowchart showing a portion of a control algorithm relating to no demand operation for use in a hybrid propulsion system of the second form of the invention;

FIGS. 11A and 11B are flowcharts showing portions of the control algorithm relating to a demand for drive in the hybrid propulsion system; and FIG. 12 is a flowchart showing a portion of the flowchart of a control algorithm relating to a demand for braking in the hybrid propulsion system.

DETAILED DESCRIPTION OF EMBODIMENTS OF THE INVENTION

Figure 1A:
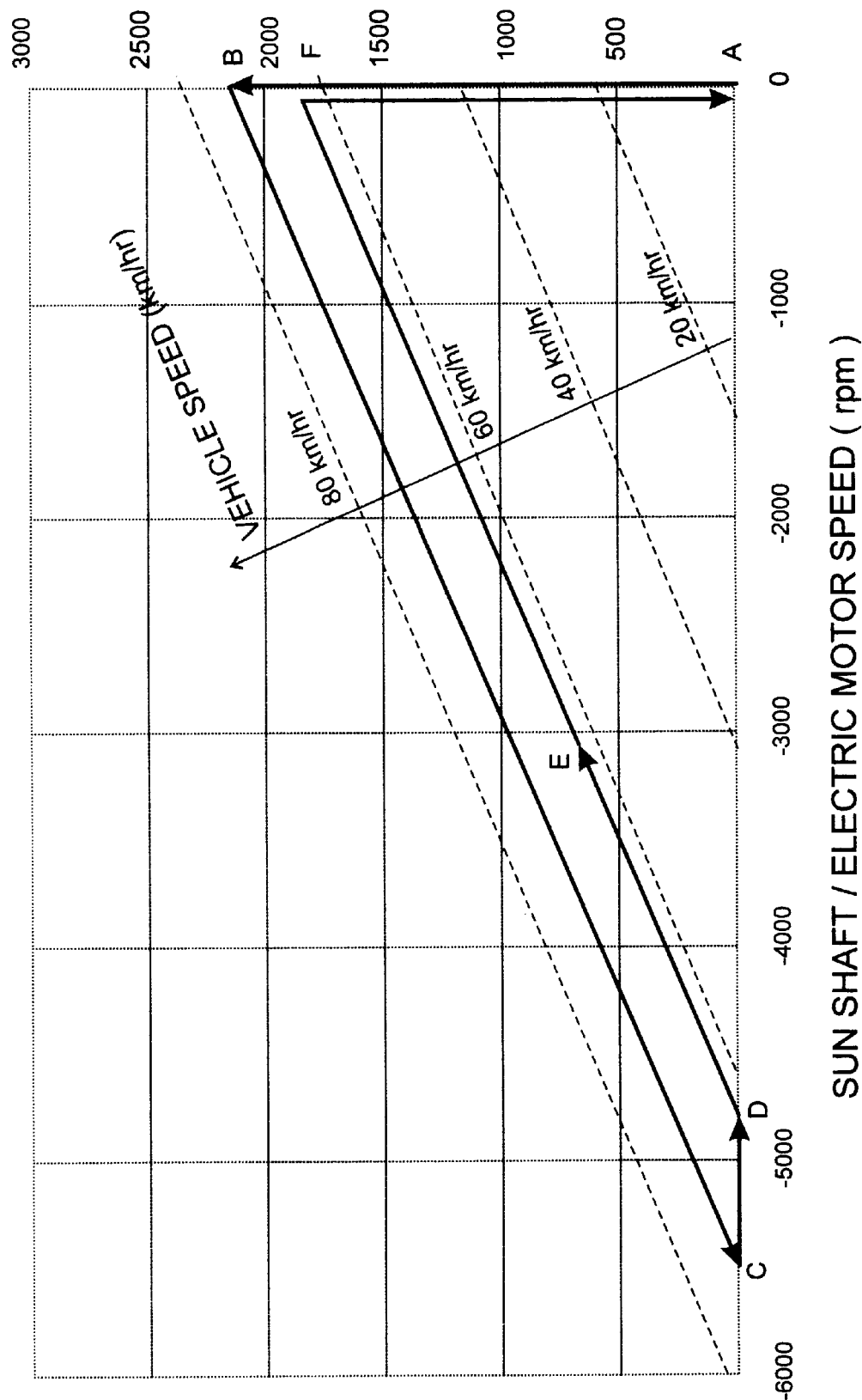
FIGS. 1A and 1B are graphs showing an epicyclic gear speed map of a mechanical transmission suitable for first and second forms of the invention, respectively.
Figure 1B:
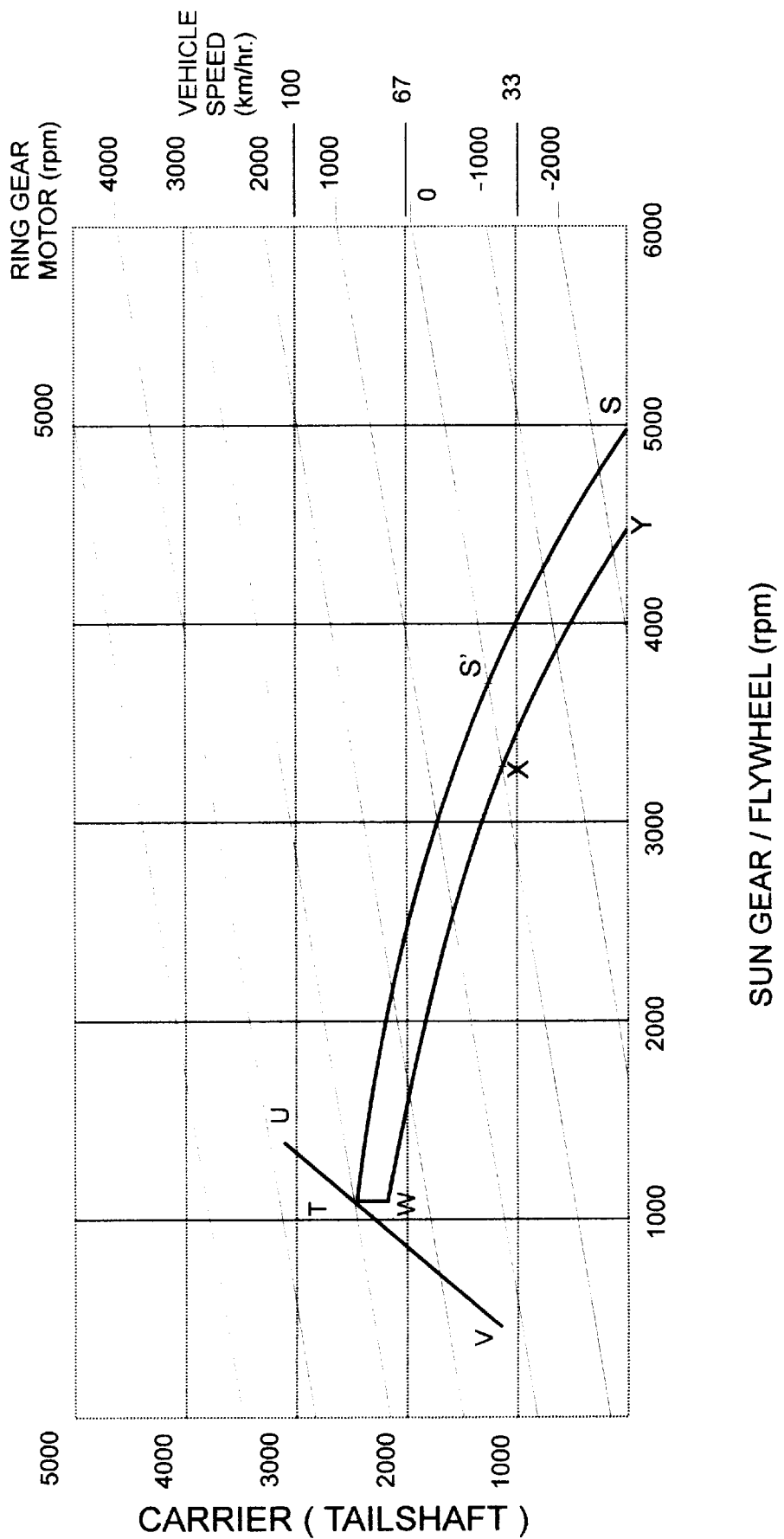

In the drawings, like reference numerals refer to like parts. FIG. 1 shows a speed map for drive units of the propulsion system of the invention which are coupled to an epicyclic gear train. The left hand plane of operation, (when the sun shaft of an epicyclic gear train is rotating in the negative direction according to the chosen sign convention) shown in FIG. 1A, relates to a first form of the invention. The right hand plane of operation, (when the sun shaft of an epicyclic gear train is rotating in the positive direction according to the chosen sign convention) shown in FIG. 1B, relates to a second form of the invention. This speed map will be described in more detail below in relation to particular embodiments of each form of the invention.

Figure 2:
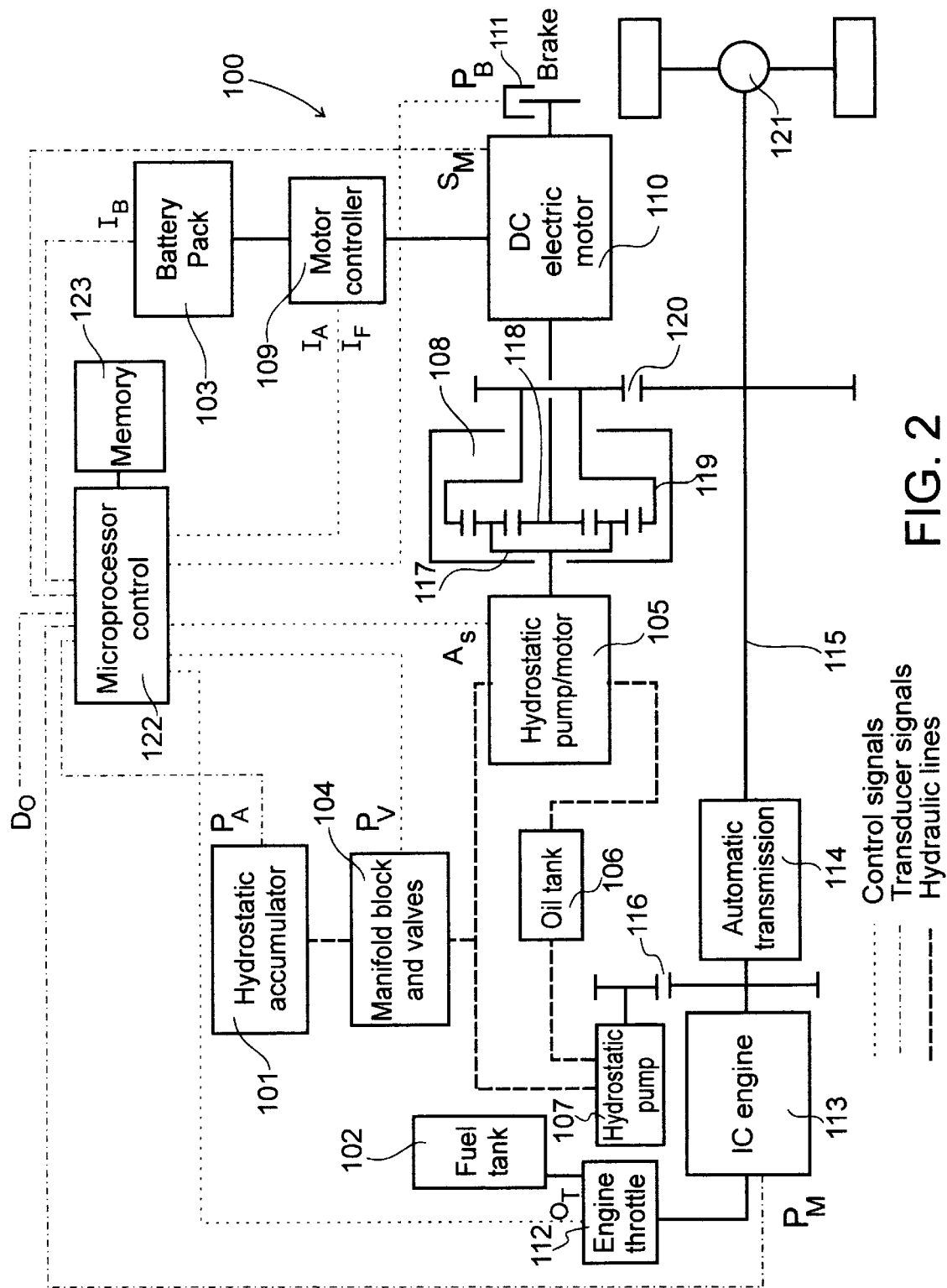
FIG. 2 is a block diagram of a hybrid propulsion system of an embodiment of a first form of the invention suitable for non-transit type omnibus operations.

A first embodiment, which is an example of a hybrid propulsion system configured for non-transit omnibus operations in accordance with a first form of the invention, is represented by the block diagram shown in FIG. 2. The propulsion system 100 is particularly suited to relatively low range operations, due to the need to stop frequently in the case of city operations and also to the restricted hours of operation in morning and afternoon periods, in the case of school operations. The propulsion system includes three disparate energy storage means, namely a fluid pressure storage means in the form of a hydrostatic accumulator 101, a chemical energy storage means in the form of a fluid fuel tank 102, and an electrical energy storage means in the form of a battery pack 103.

The hydrostatic accumulator 101 is in a fluid hydraulic circuit with a fluid pressure control means in the form of manifold block and valves 104, a first hydraulic machine in the form of a hydrostatic pump/motor 105, a sump or oil tank 106 and a second hydraulic machine being a hydrostatic pump 107. The hydrostatic pump/motor 105 is coupled to a power splitting mechanical transmission means, in the form of a three shaft epicyclic gearbox 108 in the embodiment.

The battery pack 103 is in an electrical circuit with an electrical energy conversion means in the form of a motor controller 109 which supplies drive current to an electrical machine in the form of a direct current (DC) electric motor 110. The drive shaft of the electric motor 110 is coupled to the epicyclic gearbox 108 and to a brake means 111.

The fluid fuel tank 102 supplies fuel such as petrol or liquid petroleum gas (LPG), via an engine control means in the form of a throttle assembly 112, to a combustion engine in the form of a spark ignition internal combustion engine 113. Other embodiments might employ diesel fuel where an efficient turbo supercharged compression ignition engine is specified. The internal combustion (IC) engine 113 is coupled, via a speed changing transmission 114 preferably an automatic transmission, to a tailshaft 115. A clutch and torque converter may be substituted for the automatic transmission in other embodiments. The hydrostatic pump 107 is coupled, preferably by a first gear set 116, between the internal combustion engine 113 and the automatic transmission 114.

The hydrostatic pump/motor 105 is preferably coupled to a planetary gear carrier 117 of the epicyclic gearbox 108, the electric motor 110 is coupled to a sun gear 118 of the epicyclic gearbox 108, whilst the ring gear 119 is coupled to the tailshaft 115 via a second gear set 120. Accordingly, the output shaft of the epicyclic gearbox is connected in parallel to the tailshaft 115 by the second gear set 120. The tailshaft may, in turn, be coupled to a final drive assembly 121 of a vehicle such as an omnibus.

It is thus convenient to consider the hybrid propulsion system, when configured in accordance with a first form of the invention, as preferably including three drive units as follows:

(A) a fluid drive unit comprising, in the present embodiment the hydrostatic pump/motor 105, the manifold block and valves 104 and associated accumulator 101;

(B) an electric drive unit comprising, in the present embodiment the electric motor 110, the motor controller 109 and the battery pack 103; and (C) a combustion drive unit comprising, in the present embodiment, the IC engine 113, engine throttle assembly 112 and fluid fuel tank 102. Each of the drive units is mechanically coupled to the final drive 121 for propelling an omnibus, preferably the electric motor 110 and hydrostatic pump/motor 105 being selectively coupled to respective shafts of the three shaft epicyclic gearbox 108. A third shaft of the epicyclic gearbox, nominally the output shaft, is coupled to the tailshaft 115 in parallel with the combustion drive unit and automatic transmission 114.

In the first embodiment, the fluid drive unit and the electric drive unit are the primary drive units and are arranged to operate regeneratively. In contrast the combustion drive unit performs in a secondary role and does not operate regeneratively. A particularly preferred objective of the present invention is the minimisation of losses in the hybrid propulsion system. This may be achieved by operating the drive units, particularly the primary drive units, when most efficient over the entire speed and torque regimes. This is in part effected by the specification of the drive units, the shafts of the epicyclic gearbox to which they are connected and in part by the propulsion control means, including a microprocessor control unit or microcontroller 122 with associated memory unit 123 in the embodiment, which control means is interfaced to status transducers and control devices associated with each of the drive units. The propulsion control means is described in further detail hereinafter. The vehicle operator's demand for either positive power (drive) or negative power (braking) is represented by the transducer signal $D_O$ fed to the microcontroller 122 in FIG. 2.

It is also preferable that the drive units are arranged in a modular fashion so that they might be conveniently installed in and perhaps later removed from the hybrid propulsion system, whether for the purpose of maintenance, reconfiguration or upgrade. Each module is sized to produce the appropriate power and energy levels with a minimum energy loss over a typical operating drive cycle which are determined from a number of parameters, including:

(1) the average speed of the routes in the drive cycle;
(2) the average number of stops per kilometre;
(3) the standard deviation of the length and gradient of hills on the routes;
(4) the allowable maximum speed of the bus;
(5) the number of hours of daily operation;
(6) the availability of the necessary infrastructure for opportunity charging during the drive cycle; and
(7) the number of passengers (both seated and standing) to be carried in a particular sized omnibus.

Figure 3:
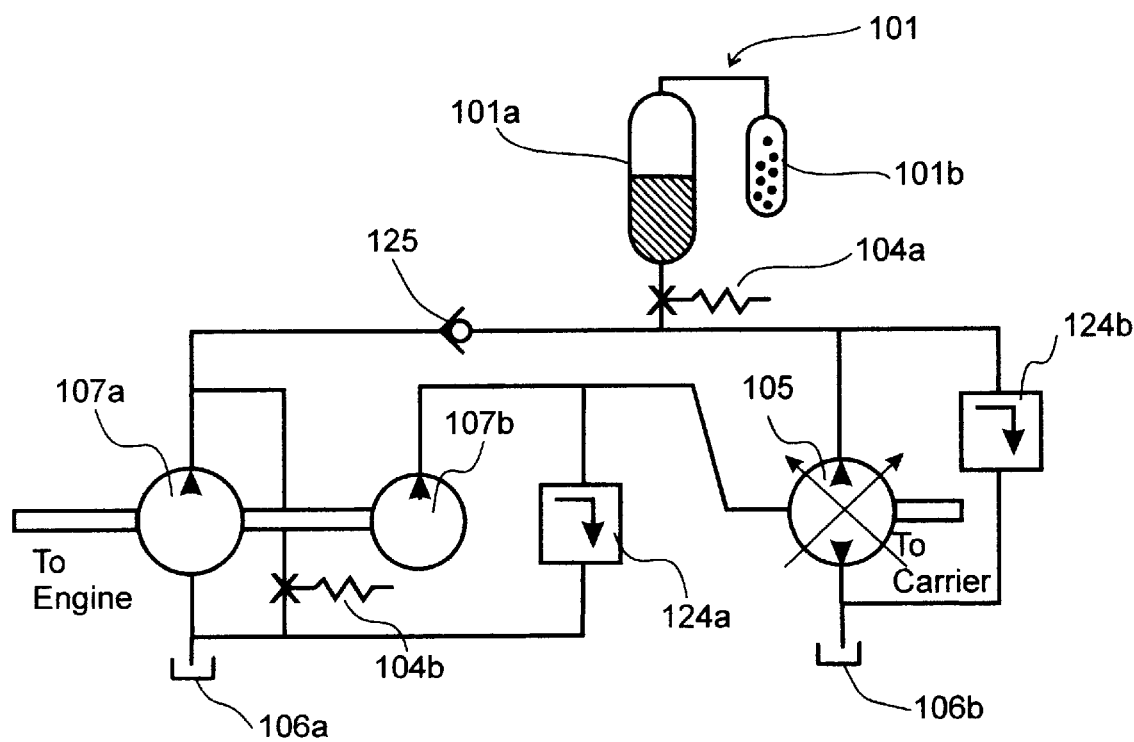
FIG. 3 is a schematic diagram of a fluid drive unit for a hybrid propulsion system of the embodiment illustrated in FIG. 2.

In the case of the fluid drive unit, the microcontroller 122 receives a signal indicative of the pressure $P_A$ in the hydrostatic accumulator 101 and provides control signals, such as swash plate angle $A_S$ and valve settings $P_v$ to the manifold block of the hydrostatic pump/motor 105 and valves 104 in the hydraulic circuit. A typical circuit arrangement for the fluid drive unit is shown in FIG. 3. The hydrostatic pump/motor 105 is a 180 cc variable displacement machine, which displacement may be varied by means of a swash plate. A suitable hydraulic machine is, for example, a 180 cc A4VSO as manufactured by Rexroth which is rated at 190 kW with a maximum torque of 1000 Nm. The A4VSO machine is capable of operating in open circuit, not needing a priming pressure in order to draw fluid from a first oil sump 106b. When motoring, the hydraulic machine supplies torque to the planetary gear carrier 117 of the epicyclic gearbox 108 (see FIG. 2). When pumping it receives torque from the gearbox, whether supplied by the final drive during deceleration of the omnibus or from the electric motor 110 when the omnibus is stationary. In the latter case, the omnibus has its wheel brakes applied to allow a reaction torque on the ring gear 119 of the epicyclic gearbox 108. The planetary carrier 117 may then be driven by the torque supplied by the electric motor 110 via the sun gear 118.

The accumulator 101 may also be charged very efficiently by a small, auxiliary fixed displacement hydrostatic pump 107a, for example a 16 cc A2FO also manufactured by Rexroth, driven by the IC engine 113. The small hydrostatic pump 107a draws fluid from a second sump 106a, and may be short circuited by solenoid valve 104b when not required. A very small gear pump 107b is coupled to the IC engine to generate the low flow necessary for the control of swash plate angle. The pressure drop across the gear pump 107b is regulated around 20 bar by a low pressure regulator valve 124a. In other embodiments the gear pump may be replaced by a small auxiliary accumulator fed from the main accumulator via a pressure controlled solenoid valve, which maintains control pressure at between 20 and 30 bar.

The pump/motor 105 is in fluid communication, via solenoid valve 104a, with the hydrostatic accumulator 101 which comprises two cylinders operating at a pressure ratio of 2:1 in the embodiment. Although this pressure ratio does not provide as much energy as a larger ratio (such as 3.45:1) on a discharge which immediately follows a complete charge, it produces higher average torque levels at the motor. It also results in a lower percentage loss of pressure following a charge, due to the smaller temperature rise of the nitrogen during compression. The pressure drop across the hydrostatic pump/motor 105 is limited to 345 bar by high pressure regulating valve 124b. There is also a non-return valve 125 on the downstream side of the accumulator 101 which prevents discharge of the high pressure portion of the hydraulic circuit if the bypass valve 104b is open.

The primary accumulator 101a is, for example, of the oil-nitrogen type with a 50 L capacity, whilst a secondary 20 L accumulator stage 101b (approximately half the size of the primary) is used without oil and connected on the gas side of the primary accumulator 101a. This staged configuration has several benefits. First it is more economical as the secondary receiver does not require a bladder to separate the oil from the nitrogen and secondly the smaller secondary receiver can contain a heat transfer medium, such as some stainless steel wool or perforated sheet, to effectively add additional heat capacity to the gas resulting in thermal energy being transferred at a higher rate, thereby reducing the temperature rise on compression and also reducing the temperature drop on expansion. The pressure loss normally experienced is reduced when the bus is stationary because the thermal energy is stored in the heat transfer medium instead of being lost to the environment. This energy is recovered on the expansion of the gas which is not possible without the heat storage medium. Further, the pump 107a can use fuel (and thus energy) normally wasted in idling the IC engine 113 to provide some or all of the oil to maintain pressure in the accumulator.

In other embodiments a tertiary "nitrogen only" accumulator stage containing a heat transfer medium may be connected after the secondary accumulator 101b. This enables the gas flowing past the medium in the secondary accumulator (i.e. to and from the tertiary accumulator) to have a higher heat transfer capability thus further reducing energy loss.

Higher gear reductions can be used by increasing the gear ratio from the ring gear 119 to the tailshaft 115, such as by second gear set 120. In order to maintain an upper speed limit on the electric motor 110, power would need to be transferred from the small hydrostatic pump 107a (coupled to the IC engine 113) to the hydrostatic pump/motor 105 (coupled to the planet carrier 117). A minimum speed ratio of 0.09:1 (16:180), determined by the relative displacements of the two hydrostatic machines, is possible. Furthermore, with a reduced swash plate angle, the gear ratio could be two to three times this value.

Figure 4:
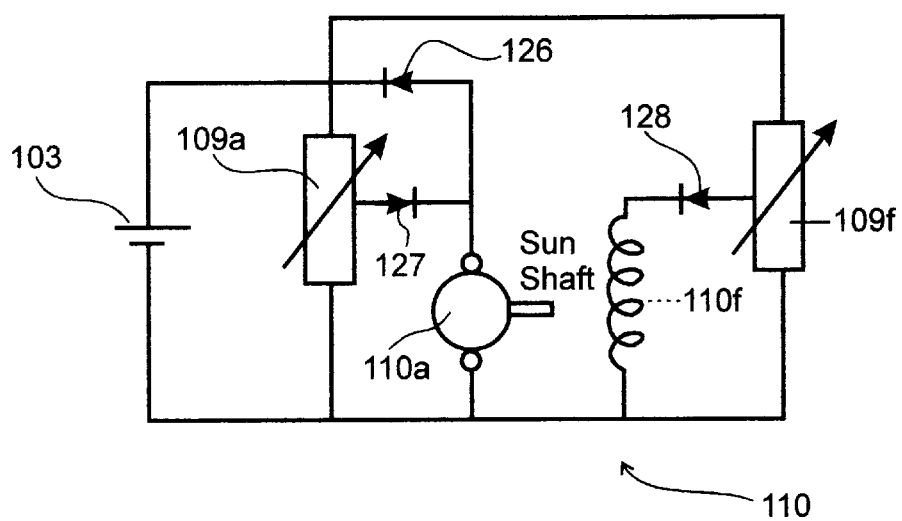
FIG. 4 is a schematic diagram of an electric drive unit for the first hybrid propulsion system.

FIG. 4 shows the elements of a conventional electric drive unit suitable for use with a hybrid propulsion system of the first form of the invention such as illustrated in FIG. 2. The DC motor 110 includes an armature 110a and a field winding 110f, which are supplied by an armature controller 109a and a field controller 109f, respectively. Power diodes 126 and 127 are provided in the armature circuit and a further power diode 128 is part of the field circuit. The controllers may include solid state devices, such as silicon controlled rectifiers (SCR) and the like, which may be conveniently interfaced with the microcontroller 122. The microcontroller monitors the status of the electric drive unit via transducers for motor speed $S_M$ and for battery current $I_B$. The mechanical brake 111 on the motor shaft extension is also actuated by a control signal $P_B$. An example of a suitable rotary electric machine is a N180L manufactured by Nelco, rated for 40 kW at 3500 rpm. The microcontroller 122 controls the armature current $I_A$ and field current $I_F$ to efficiently produce the required torque at the shaft of the sun gear 118 over a wide range of motor speeds $S_M$. Control circuits for battery 103 powered traction motors 110 of this kind may be designed by persons with normal skill in the art, and are thus not discussed in any detail.

In normal operation, the electric motor 110 is not used for accelerating the omnibus below about 50 km/h. Thus the motor can be sized for a smaller multiple of the level road cruise power required for the vehicle, for example a factor of two (2) rather than a factor of five (5) as in the case of a conventional (non-hybrid) electric powered omnibus. In the embodiment which omits the combustion power unit, a factor of three (3) times level road cruise power may be required. A typical DC system would use a battery pack with a voltage of between 144 and 168 volts and have a mass of around 16–20% of the GVM of the bus. The battery pack preferably includes low maintenance valve regulated lead acid batteries, of either the gel electrolyte or absorbed glass mat types, operated at a partial state of charge (SOC). A motor current of 250 amperes provides the rated power, although short transients of up to 500 amperes may be possible. Other embodiments may employ electrostatic, rather than electrochemical, electrical energy storage means such as one or more super capacitors.

Regeneration into the battery is generally undertaken for omnibus speeds in excess of 45 km/h during braking, whether the vehicle is coming to a complete stop or running downhill at a substantially constant speed. The motor controller 109 limits both voltage and the maximum armature current $I_A$ as well as modulating the battery current $I_B$ via the field current to achieve the desired level of high speed regeneration into the battery 103. Thus a relatively simple motor controller 109 and a medium battery voltage of 140 to 160 volts can be employed for this purpose. The operating voltage is approximately half that required for a typical 3-phase inverter AC type drive unit and leads to greater flexibility in the choice of batteries. A DC drive unit is thus preferred because it is less expensive and incurs fewer energy losses when operated as set out above, although the system can use an AC drive instead of the DC controller 109 and motor 110.

Turning to the IC engine 113, the embodiment employs a 2 L spark ignition engine, for example a horizontally opposed 4 cylinder engine delivering approximately 90 kW as manufactured by Fuji Heavy Industries (Subaru). Fluid fuel, such as petrol and/or LPG is stored in tank(s) 102 and delivered to the engine by the throttle assembly 112 under control of the microcontroller 122, which adjusts the throttle opening $O_T$. The microcontroller also monitors the manifold pressure $P_M$ of the engine, as this parameter is indicative of engine torque. These engines also may include a local processor for optimising operation over a range of power demand, ambient and load conditions, with reference to a multidimensional "map" of known engine performance capabilities. In other embodiments the engine may be fuel injected and/or include mechanical or turbo supercharging.

There are a wide variety of advanced spark ignition engines supplied to a very large automotive market. In general, these engines have been optimised to produce low levels of air pollution and are considerably quieter and lighter than the large diesel engines conventionally used to power omnibuses. Although more lightly constructed and generally operated at higher speeds, such engines have been shown to deliver as much as 20000 hours of operation between overhauls in taxi service when fuelled with LPG. However, they have a maximum thermal efficiency of 30–32% which compares with a range of some 38–42% for a turbo-supercharged intercooled diesel engine. When energy storage facilities are available—as in the case of the present hybrid propulsion system—and the spark ignition engine operated at high absolute manifold pressures and at minimum speeds, the lower thermal efficiency is overcome by the relative improvements in overall vehicle performance. This is due to their lighter mass, lower capital cost, lower pollution levels, lower noise and greater flexibility with fuel type.

In a second embodiment of a propulsion system configured in accordance with the first form of the invention, a clutch and torque converter may be substituted for the automatic transmission 114 of the first embodiment, whilst a mechanical brake (similar to brake 111 on the electric motor) may be coupled to the hydrostatic pump/motor 105 to reduce the leakage loss at zero pump speed.

The speed map of FIG. 1A shows the relationships of the speed of the three shafts of the epicyclic gearbox 108 and consequently the speeds of the vehicle, hydrostatic pump/motor and the electric motor. The tailshaft 115 is driven from the ring gear 119 via a gear reduction 120 of 1.3:1 in this illustration. The electric machine 110 (maximum speed of 6000 rpm) is directly connected to the sun gear 118 and the hydrostatic pump/motor 105 (maximum speed of 2,200 rpm) to the carrier 117 of the epicyclic gear set. The torque relationship between the three shafts of the epicyclic gearbox 108 which has a speed ratio of the sun 118 to the ring 119 of −1.92 when the speed of the carrier 117 is zero.

To provide a peak acceleration of 2.3 m/s$^2$ for an omnibus with, for example, a gross vehicle mass (GVM) of 6 tonnes, a tyre radius of 0.4 m and a final drive 121 differential gear ratio in the of 5.625, a tailshaft torque of 920 Nm is required. This reflects to a maximum hydrostatic pump/motor torque of 1179 Nm. If power was to be utilised from both the electric machine and the hydrostatic machine (at full displacement) an electric torque at the sun shaft of 458 Nm would be required and half of this value (229 Nm) when the accumulator was drained of energy. This situation arises if a pressure ratio between maximum and minimum pressures of 2.0 is used.

The optimum rated power of the electric motor is about 40 kW and a stall torque of 220 Nm is appropriate with a corner speed of about 3,500 rpm. The mechanical brake 111, which has a torque rating of at least 500 Nm, is attached to a through shaft of the electric machine 110 allowing utilisation of the torque of the hydrostatic machine at zero speed.

The operational modes of the hybrid propulsion system of the invention will now be described with reference to FIG. 1A.

(i) Acceleration Mode

Assuming the accumulator 101 is fully charged, initially the brake 111 on the electric machine 110 is on and the vehicle is stationary. The vehicle mechanical brakes (not shown) are then released and the accumulator solenoid valve 104a is opened. If the accumulator pressure $P_A$ has been maintained via the hydrostatic pump 107, the solenoid will be open and the brake 111 on the electric machine applied subsequent to the release of the vehicle brakes.

The omnibus is accelerated by the hydrostatic machine 105, acting as a motor, until the accumulator 101 is almost empty (see path A–B in FIG. 1A). The pressure $P_A$ is monitored by the microcontroller 122 with status signals supplied by a pressure transducer (not shown). As the maximum torque of the hydrostatic motor is reducing because of the pressure drop in the nitrogen the electrical machine is energised. First the field current $I_F$ is applied to the machine and secondly the armature current $I_A$. The brake 111 on the electric machine 110 is released which reduces the speed of the hydrostatic motor and accelerates the electrical motor whilst continuing to apply torque to the tailshaft 115 due to the small but important inertial reaction of the elements connected to the carrier shaft 117. There is thus a substantial increase in the speed of the electric motor leading to the most efficient regime of operations (path B–C in FIG. 1A).

The IC engine is normally not used for accelerating bus, and may be engaged above around 45 km/hr if required. For high accelerations or starting on steep hills, the IC engine can be utilized at all speeds if the automatic transmission is fitted. For an embodiment which includes a clutch under the above conditions, the IC engine drives the pump 107 to transfer power to hydrostatic motor 105.

(ii) Cruise Mode

The vehicle operates at cruising speed as a normal electric omnibus and this is entirely satisfactory on flat terrain as a continuous power of 40 kW can be applied to the tailshaft 115, with higher power levels available on motor overload to cater for any small hills. The electric motor 110 is predominantly used for cruise whilst the battery pack 103 has a medium to high state of charge. When the state of charge falls, the IC engine 113 may be utilised in preference to the battery for both cruise and hill climbing, depending on the expected distance to complete the mission for the day or before arriving at the next battery charging station.

The battery pack 103 and hydrostatic accumulator 101 in the first form of the invention are preferably optimised for flat terrain operation to provide cruise energy (ie. driving at approximately 45 to 80 km/h) and acceleration energy, respectively. If operating in hilly terrain, the battery pack 103 could alternatively be optimised for both hill climb and cruise energy. In both cases the IC engine acts as a backup, with a significant proportion of the total energy required for a drive cycle preferably being sourced from the electricity grid between or during drive cycles. For example the battery pack could accept 10 minute charges of moderate power, 3.3 kWh from a charger with a 20 kW capacity, which is equivalent to a range of 3 to 4 km for a large 10–12 metre (12 to 15 tonne) omnibus or 6 to 8 km for a 6–7 metre (6 to 7 tonne) omnibus.

(iii) Deceleration Mode

For downhill running at vehicle speeds in excess of 45 km/h, the power absorbed by the battery charge function of the electric drive unit can provide the torque equivalent of a 0.5 ms$^2$ retardation. In this scenario the electric machine 110 operates as a generator to supplement the charge state of the battery pack 103.

For a normal deceleration of the vehicle the microcontroller 122 sets both the field current $I_F$ and the angle of the swash plate $A_S$ to generate a trajectory such as path D–E (see FIG. 1A) down to an electric motor speed of 3000 rpm. At this point, the electrical motor can no longer produce a significant torque, whereupon the displacement of the pump 105 is increased. This reduces the electric motor speed rapidly to zero (point F in FIG. 1A). From this point the hydrostatic machine 105 controls the torque to the tailshaft 115 following the application of the brake 111 on the electric motor 110. Regeneration down to zero bus speed (path F–A) is thus possible producing sufficient torque to generally require minimal application of the vehicle wheel brakes.

It should be noted that a brake on the hydrostatic machine is optional as the swash plate angle of the hydrostatic pump/motor 105 can be set at a maximum value (pumping) when the motor current is positive and the accumulator valve 104a is closed. These settings effectively lock the carrier shaft 117. For electric regeneration, the swash plate angle is reversed and the accumulator valve 104a is closed to again lock the carrier shaft.

(iv) Stationary Mode

The accumulator is charged effectively and efficiently when the vehicle is stationary by using the IC engine 113 at idle and pump 107, or by using electric motor 110 and pump/motor 105. For charging with engine 113 and pump 107, the automatic transmission 114 is disengaged and the speed of the engine is adjusted to bring the pressure with the flow of oil from the hydrostatic pump 107 to 345 bar in an appropriate time. The engine idle power used to charge the accumulator 101 can be obtained at virtually no extra cost in fuel consumption. The 2 litre engine at 500 rpm could provide 3 kW at normal idle fuel consumption of 1.5 L/h when the engine is operated at high throttle (manifold pressure near atmospheric pressure) and low speed. The engine speed will be constrained by the load torque during this operation.

An automatic transmission having a torque converter without a clutch during charging for a stationary vehicle limits the engine speed to just above idle speed but no more than 900 rpm. The IC engine coupled to a torque converter can increase the tailshaft torque by up to 270 Nm for low vehicle speeds. In other embodiments a torque converter could be placed between the engine and the first gear set 116 driving the pump (while still retaining a clutch between the two gear sets 116, 120) which would increase the flexibility in operation. However from a practical standpoint, this may not be worth the extra mechanical complexity as the pump 107 could be fitted to the front of the engine and the torque converter attached directly to the flywheel output of the engine with a standard bell housing surrounding the torque converter.

The operation of the propulsion control means which includes microcontroller 122 and memory 123 will now be described in relation to the control flow chart shown in FIG. 5. The control algorithm is an embodiment of a method for controlling a hybrid propulsion system of the first form of the invention. The propulsion control means controls the drive units from which the power and energy is delivered to or from the tailshaft, and which path will be taken by said power or energy within the hybrid propulsion system. It will be appreciated that the algorithm is iterative and responsive to changes in power demand, propulsion system state and vehicle operating mode, as described below.

With the flexibility available in the microcontroller 122, for controlling both the field and armature currents, as well as the displacement of the hydrostatic pump 105, optimum condition for charging can be used for any state of accumulator 101 charge if for some reason the IC engine is not available. When the internal combustion engine 113 is available, it enhances many of the attributes of the hybrid propulsion system of the invention. These attributes include range extension, additional acceleration capacity (with a clutch above 20 km/h and a hydrodynamic torque converter or an automatic transmission for zero speed) and enhanced hill climbing ability. The use of a hydrodynamic torque converter is mainly to provide improved hill climbing capability. However superior performance could be obtained using a standard automotive automatic transmission 114 which contains the clutch (transmission in neutral), the torque converter and in addition several gears, as per the embodiment shown in FIG. 2.

FIG. 5A and FIG. 5B together show an overview flow-chart for a typical control algorithm 200 which has a primary input, namely the input signal $D_O$ from the operator of the vehicle in the form of a demand for power, meaning power delivered to the vehicle wheels. The demand may be for positive power, i.e. to accelerate or to cruise, or a demand for braking of the vehicle (negative power), or a nil demand for power. Step 201 thus determines whether the demand is negative 202, zero 203 (vehicle stopped) or positive 204. As set out earlier in relation to FIG. 2, the demand signal $D_O$ is derived from a transducer which is manually operated by the vehicle operator and sent to the microcontroller 122.

In the case of a demand for positive power 204, and with reference to FIG. 5B, the power is supplied by either the electric motor 110 or the main hydrostatic pump/motor 105. The choice of which unit to use is dependent on the propulsion "system state". The system state is determined from a number of parameters, including the energy stored in each of the accumulator 101 and the battery pack 103, the speed of the vehicle and the speed of the IC engine, the hydrostatic and electric motors and the current vehicle operating mode which are obtained in step 205. Based on this information, one or more of the drive units is selected to drive the vehicle in step 206. The power (or torque) generated by the electric motor or the hydrostatic motor is varied depending on the demand signal $D_O$.

For example, if there is energy available in the accumulator 101, then step 211 determines that the hydrostatic motor 105 is to be used to drive the vehicle after ensuring the mechanical brake is applied to the electric motor at step 212. The swash plate angle $A_S$, of the hydrostatic pump/motor is varied in accordance with the available accumulator pressure PA and acceleration demand at step 213. The IC engine 113 is used to supplement the drive power by charging the accumulator at step 216. The engine's throttle opening $O_T$ is increased at step 215 only after maximum power is being extracted from the hydrostatic motor, as indicated by maximum swash angle test 214.

However, if there is no energy in the accumulator or if the speed of the vehicle is such that the speed limit of the hydrostatic pump/motor 105 would be exceeded, the electric motor 110 is selected at step 207. If required, the accumulator solenoid valve 104a is closed and the hydrostatic pump/motor is stopped at step 208. The electric motor is controlled by motor controller 109 to apply power at a level dependent on the charge state of the battery pack and the acceleration demand. When using the electric motor 110 to drive the vehicle, a combination of power from the batteries and the IC engine will be applied at step 210 depending on the state of charge of the battery pack 103, after checking battery state at step 209. If the battery pack is fully charged, full power is applied by the electric motor before any additional power is added by the IC engine. If the battery pack is nearly discharged, power is then added by the IC engine.

To provide positive power from either the electric or hydrostatic pump/motor, the other drive unit coupled to the epicyclic gearbox 108 is preferably held stationary. In the case of the electric motor, the mechanical brake 111 on the motor shaft is applied to hold the motor stationary. For the hydrostatic machine 105, a mechanical brake could also be used but an alternative is to operate the machine as a pump but with the accumulator valve 104a closed so that no oil can flow (provided the pressure generated in the hydraulic lines does not exceed their maximum capability which is preferred in this system).

In the case of negative power demands 202 for braking the vehicle, a similar process applies as shown in FIG. 5A. The system state is obtained at step 217 and used to determine at step 218 which of the regenerative units (i.e. the electric motor/generator or the hydrostatic pump/motor) may be used to absorb energy from the vehicle. When regenerating at step 219 with the electric motor/generator 110, it is normally only possible to regenerate into the battery pack 103 down to approximately half of the electric machine's maximum speed, i.e. to approximately 3000 rpm. (In contrast when motoring, power can be applied from the electric machine over the entire speed range). The negative power demands are preferably handled by either the electric machine (as above) or by the hydrostatic machine pumping fluid pressure into the accumulator, whilst the other machine is held stationary, see steps 220–221 and steps 223–224.

With the hydraulic unit, regeneration at step 222 can be conducted at any speed within the design limitations of the hydrostatic pump/motor 105. If the accumulator 101 fills during this operation, the pump may still be used to brake the vehicle with the energy being dumped through a pressure relief valve 124b (see FIG. 3) instead of being stored in the accumulator. An alternative to dumping the energy through the relief valve is to use the vehicle's wheel brakes. In both cases, the energy is lost in heat.

For both acceleration and braking, it is possible to operate both the hydrostatic pump/motor and the electric motor/generator simultaneously (not shown in FIG. 5) but there are limitations in operation. The hydraulic unit is limited in available energy and the electric unit is limited in maximum torque, thus limiting the operating range where both units can be operated simultaneously.

When the vehicle is stationary 203 there being no demand for wheel power, it is determined at step 225 whether the accumulator is full. If not full, it is possible to charge the accumulator at step 226 using the IC engine 113 to drive a small fixed displacement pump 107 coupled to the engine. The IC engine throttle opening $O_T$ will be varied to maintain the engine at idle speed. If a clutch is provided or neutral is selected in the automatic transmission, it is possible to charge the accumulator at a faster rate by increasing the engine speed. Generally, the main hydrostatic pump/motor 105 and the electric machine 110 would not be used, as indicated at step 227. If the accumulator is full, the IC engine idles 228 normally. In other embodiments, it may be possible to charge the battery pack from a convenient mains supply.

Some examples of how the control method operates to control the propulsion system in particular circumstances follow:

(a) Above a speed of 15 km/h the IC engine can be clutched in providing 120–150 Nm of tailshaft torque with no loss in an embodiment not employing a hydrodynamic torque converter or automatic transmission installation.

(b) The IC engine can deliver power of 24 kW via the hydrostatic pump 107a, hydraulic circuit (FIG. 3) and the hydrostatic pump/motor 105 to provide a higher cruise speed of up to 100 km/h. This calls for an engine speed of 3000 rpm, an electric motor speed of 6000 rpm and a hydrostatic motor speed of 600 rpm operating with reduced displacement. Although this is not the most energy efficient mode of operation, it enables some over speeding of the bus beyond the nominal design speed of 80 km/h, without over speeding the components of the hybrid propulsion system.

The microcontroller 122 preferably facilitates adaptive operation, being arranged to record statistics of various propulsion system parameters, including armature current $I_A$ and manifold pressure $P_M$. For example the occurrences of armature current $I_A$ of the electric machine 110 in excess of the level road current requirement, allow the probability of power requirement for hill climbing and cruise to be deduced. A choice of the optimum strategy in the utilisation of any remaining battery power for either cruise or hill climb preference may then be made. Similarly statistics of the manifold pressure $P_M$ of the IC engine 113 will be recorded as this is directly related to engine torque and hence to engine efficiency at any speed.

Should the microcontroller calculate that the engine has been operating at less that optimum efficiency it may adapt the control strategy to lock up the torque converter should this not have been the case previously, then disconnect the clutch and move to engine idle charge of the accumulator. The accumulator may be charged to a pressure which will be a function of the average speed of the bus during the preceding 10 minutes or so that the bus has been moving. When the accumulator has reached the optimum pressure for the average speed, the brake on the hydraulic machine will be released and the speed of this shaft increased with a consequential reduction in speed of the electric motor and hence demand on the battery, provided there is no increase in the torque demand. Should there be an increased demand for tailshaft torque, the energy from the accumulator with be able to reduce the energy required from the battery without necessarily reducing the bus speed.

The above are examples of the adaptive nature of the control algorithm which is possible with the components of the preferred three (3) energy source propulsion system. It is possible to meet the rigorous torque demands over a rapidly changing stochastic speed profile with minimum energy losses because the components are connected in such a way that they can be used when their losses are at a minimum. Furthermore, all electromechanical components have different levels of loss as a function of torque and speed and in the case of the energy storage elements different levels of loss depending on the rate of energy extraction.

Another important criterion relevant to the energy storage systems is the total energy storage capacity and the associated standby losses. In the total system described above each of the 3 sources of energy can be utilised effectively for all reasonably expected traffic conditions in any congested city. The omnibus is equally at home in a situation of 5 stops per kilometre or a reasonably hilly environment. It is designed with the aim of utilising less than 20% to 30% of the fluid fuel energy of a pure IC engine driven bus in stop start driving situations between 100 and 200 km ranges respectively. Hence it is preferable to limit the application to 200 km between battery charge if valve regulated lead acid batteries are installed.

The propulsion system of the embodiments have several advantages over prior art arrangements. The use of the electric motor primarily for cruise mode operations allows a smaller rated machine to be employed. This leads to the possibility of using the thermal properties of the motor and battery (usually otherwise expended when accelerating from low speeds) for hill climbing. This would give a similar medium speed hill climbing capability on a current overload as would be obtained by a larger motor in prior art electric drives.

During braking on a long downhill run, the battery pack of the embodiment (lead acid battery pack having a mass of about 0.3 of the GVM) can store the energy of a bus descending a 2000 m hill, assuming an 80% depth of discharge at the top of the hill and fully charged at the bottom. This indicates that the preferred method of operation for using the electric drive unit may be in a hilly environment. This is the antithesis of conventional operations with electric drive units as the battery is unable to cope with acceleration, level road and hill climbing demands. Furthermore the use of relatively inexpensive electric motors and controllers in the electric drive unit offsets the cost associated with the epicyclic gearbox.

Charging the accumulator when the vehicle is stationary substantially maintains the accelerative performance of the bus, particularly if the preferred multi-stage accumulator with low pressure ratio is employed which ameliorates the pressure drop which normally follows charging. This arrangement, even where no IC engine is used, can achieve consistently high accelerations in relatively flat environments.

The component sizes for the various example drive units discussed in relation to the first form of the invention are for a 6 to 7 tonne omnibus. Components for other bus sizes may be scaled linearly in accordance with anticipated GVM if the normal maximum speed is 80 km/h. However, for CBD operation 60 km/h in a more than adequate top speed capability and in cities such as Singapore, London and New York which have relatively flat topography the component sizes are adequate for a 14 tonne, 12 metre omnibus. The acceleration performance scales on the ratio of maximum bus kinetic energy and a bus of nearly twice the mass at 60 km/h has approximately the same energy as the smaller bus at 80 km/h.

A third embodiment of the invention, relating to another form of hybrid propulsion system configured for transit omnibus operations, is represented by the block diagram shown in FIG. 6. The propulsion system 300 is particularly suited to medium to high range operations, for example 200 to 400 km. The system may also be employed for suburban transit operations, perhaps as low as only 100 to 120 km. The propulsion system of the third embodiment again includes at least three different energy storage means.

A hydrostatic accumulator 301 is in a fluid hydraulic circuit with a fluid pressure control means in the form of manifold block and valves 305, a series of fluid pressure energy conversion means—including a first hydrostatic pump/motor 306, a second hydrostatic pump/motor 307 and a hydrostatic pump 308—and an oil tank 309. The first hydrostatic pump/motor 306 is coupled to a power splitting gearbox being a three shaft epicyclic gearbox 321, the second hydrostatic pump/motor 307 is coupled to a first gear set 310, whilst the hydrostatic pump 308 is coupled to a second gear set 311 in the embodiment.

A fluid fuel tank 302 supplies fuel such as petrol or liquid petroleum gas (LPG), via an engine control means in the form of a throttle assembly 312, to a combustion engine in the form of a spark ignition internal combustion engine 313. Other embodiments might use an external combustion engine in the form of a gas turbine or the like. The internal combustion (IC) engine 313 is coupled by a speed changing transmission, preferably via an automatic transmission 314, to a tailshaft 315 of an omnibus. The second hydrostatic pump/motor 307 is coupled, by the first gear set 310, between the internal combustion engine 313 and the automatic transmission 314.

A flywheel 303, which is depicted in FIG. 6 as being incorporated in the epicyclic gearbox 321 merely for the purposes of illustration, is coupled to the first hydrostatic pump/motor 306 via the epicyclic gearbox.

A battery pack 304 is in electrical circuit with an electrical energy conversion means in the form of a motor controller 316 which supplies drive current to an electrical machine in the form of a direct current (DC) electric motor 317. The drive shaft of the electric motor 317 is coupled to the first gear set 310 on a common shaft with the second hydrostatic pump motor 307.

The first hydrostatic pump/motor 306 is preferably coupled to a ring gear 319 of the epicyclic gearbox 321, the flywheel 303 is coupled to a sun gear 318 of the epicyclic gearbox 321, whilst the planetary gear carrier 326 is coupled to the hydrostatic pump 308 and also to the tailshaft 315 via the second gear set 311. The tailshaft may, in turn, be coupled to a final drive assembly 320 of a vehicle such as an omnibus.

It is again convenient to consider the hybrid propulsion system, when configured in accordance with another form of the invention, as preferably including four drive units as follows:

(A) a fluid drive unit comprising, in the present embodiment the hydrostatic machines (the first pump/motor 306, the second pump/motor 307 and pump 308) the manifold block and valves 305 and associated accumulator 301;

(B) a combustion drive unit comprising, in the present embodiment, the IC engine 313, engine throttle assembly 312 and fluid fuel tank 302;

(C) a kinetic drive unit comprising the flywheel 303; and (D) an optional electric drive unit comprising, in the present embodiment the electric motor 317, the motor controller 316 and the battery pack 304.

Each of the drive units is mechanically coupled to the final drive 320 for propelling an omnibus, preferably the first hydrostatic pump/motor 306 and the flywheel 303 being selectively coupled to respective shafts of the epicyclic gearbox 321. A third shaft of the epicyclic gearbox, nominally the output shaft, is coupled to the tailshaft 315 in parallel with and the combustion drive unit. In other embodiments it may be preferable to also couple the second hydrostatic pump/motor 307 and the electric motor 317 to the tailshaft 315 via a further power splitting gearbox.

In the third embodiment, the fluid drive unit, the kinetic drive unit and to a lesser extent the electric drive unit are the primary drive units and are configured to perform in respective regenerative modes. In contrast the combustion drive unit performs in a secondary role and does not operate regeneratively. The particularly preferred objectives set out in relation to the embodiment shown in FIG. 2 relating to minimisation of losses and the modular arrangement of drive units also apply to the this embodiment. An example of the modular arrangement is that the electric drive unit of the present embodiment may be omitted in a further embodiment of the second form of the invention.

In a similar fashion to the first form of the invention, a propulsion control means includes a microcontroller 322 and a memory 323 for storing control programs and associated data. The microcontroller 322 receives a signal indicative of the pressure $P_A$ in the hydrostatic accumulator 301 of the fluid drive unit and speed $S_m$ of the electric motor 317. The microcontroller 322 also provides control signals, such as swash plate angle $A_{S1}$, $A_{S2}$ and valve settings $P_v$ to the manifold block of the hydrostatic pump/motors 306, 307 and valves 305 in the hydraulic circuit. A typical circuit arrangement for the fluid drive unit depicted in FIG. 6 is described in relation to FIG. 7. The first hydrostatic pump/motor 306 is a variable displacement machine, which displacement may be varied by means of a swash plate. A suitable hydraulic machine is a 71 cc A4VG as manufactured by Rexroth, which is rated at 125 kW with a maximum torque of 400 Nm. When motoring, the first hydraulic machine supplies torque to the ring gear 319 of the epicyclic gearbox 321 (see FIG. 6). When pumping in order to charge the accumulator 301 or to supply oil to the second hydraulic machine 307, the first hydraulic machine receives torque from the gearbox, whether supplied by the final drive 320 during deceleration of the omnibus at high speeds or when the regenerative units are producing acceleration power at low speeds. The accumulator 301 can also be charged from the second hydraulic machine 307 when the omnibus is stationary.

The accumulator 301 and/or the flywheel 303 may also be charged very efficiently by the second hydrostatic pump/motor 307, for example a 56 cc A4VG manufactured by Rexroth, driven by the IC engine 313 supplemented by the electric motor 317. A very small gear pump 307a is coupled to the IC engine to generate the low flow necessary for the control of swash plate angle. The pressure drop across the gear pump 307a is regulated around 20 bar by a first low pressure regulator valve 324a (see FIG. 7). The A4VG machines each require a priming pressure, provided by hydrostatic pump 308 (a Rexroth A2FO displacing 63 cc), in order to draw fluid from first oil sump 309b. A by-pass valve 305c is also provided around charge pump 308.

Each of the hydrostatic machines 306 and 307 is in fluid communication with the hydrostatic accumulator 301 which comprises two units operating at a pressure ratio of 2:1 in the embodiment. The fluid drive unit may operate in both closed loop and open loop configuration instead of a conventional capacity limited low pressure accumulator. The charge pump 308 may be driven from the tail shaft 315, or directly from the IC engine 313 in other embodiments (see FIG. 8). The pressure drop across the hydrostatic machines is limited to 345 bar by high pressure regulating valves 324b and 324c. In closed loop operation, pump 307a supplies make-up oil via non-return valves 325a and 325b. Fluid may be discharged to a second oil sump 309a via a control valve 305b.

The primary accumulator 301a is an oil-nitrogen type with (for example) a 50 L capacity, whilst a secondary 20 L accumulator stage 301b (approximately half the size of the primary) is used without oil and connected on the gas side of the primary accumulator 301a. This staged accumulator configuration is similar to that described in relation to the first embodiment.

Electrical energy from the battery pack 304 is used predominately for hill climbing and in level road operation for energy substitution. The electric motor 317 is used when it is most efficient as the power is preferably utilised when the torque converter in the automatic transmission 314 is locked up. The impedance match between the motor and the tail shaft may be provided by the gear ratios in a multi-speed automatic transmission. In normal operation, the electric motor 317 is not used for accelerating the omnibus below about 50 km/h. As mentioned above the electric drive unit may be omitted entirely. This reduces the mass of the vehicle by some 1500 kg, primarily in the battery pack 304, but increases fuel consumption without substantially altering the performance of the vehicle. Although electrical energy substitution will not be available and the vehicle will likely have a reduced hill climbing ability, this configuration may be suitable for operations over relatively flat terrain.

The combustion drive unit includes an IC engine 313, in the embodiment a 5.0 L spark ignition engine, such as the V-configuration 8 cylinder engine with electronic fuel injection delivering approximately 165 kW and manufactured by the Ford Motor Company. Fluid fuel, such as petrol and/or LPG is stored in tank(s) 302 and delivered to the engine by the throttle assembly 312 under control of the microcontroller 322, which adjusts the throttle opening $O_T$. The microcontroller also monitors the manifold pressure $P_M$ of the engine, as this parameter is indicative of engine torque.

The IC engine 313 is coupled to speed changing transmission in the form of a four speed automobile automatic transmission 314 with lock-up on the 3rd and 4th gears, or preferably such as a conventional 6 speed automatic transmission manufactured by Allison for use in truck and/or omnibus applications. The 5 litre IC engine is capable of accelerating a 12 tonne omnibus to 60 km/hr in approximately 17 seconds. The vehicle is thus independent of the regenerative hydrostatic-flywheel system for vehicle operations at normally accepted performance levels but with correspondingly higher fuel consumption, should the regenerative system be unavailable for any reason.

The speed map in FIG. 1B shows the relationships of the speed of the three shafts of the epicyclic gearbox 321 and consequently the speeds of the vehicle, the first hydrostatic pump/motor and the flywheel. The epicyclic gearbox of the embodiment is a gear set from a 200 kW epicyclic gear reduction unit for a marine gear transmission and would be suitable for this system, but would be limited in torque to approximately 900 Nm on the ring gear, 1360 Nm on the carrier and 475 Nm on the sun shaft. The first hydrostatic pump/motor 306 would be coupled to the ring (input) gear 319, the planetary carrier 326 to the second gear set 311 directly coupled to the tail shaft 315 and the sun gear 318 connected to an internal 2 MJ flywheel 303 which for example is a 600 mm diameter, 280 kg, 5000 rpm steel flywheel.

The flywheel can be used to increase the inertia of the vehicle by approximately a factor of 2.3 (when the ring gear is held stationary) thus minimising the speed variation on undulating topography for speeds less than 55 km/hr. Another much smaller increase in inertia is obtained by setting the respective displacements of the hydrostatic machines so that their speeds are equal. This is equivalent to connecting the tailshaft to the ring gear shaft as well as to the carrier shaft of the epicyclic so that there is a fixed ratio between the ring and carrier shafts of the epicyclic and hence a 16% increase in the inertia of the bus. The flywheel rotational speed $S_F$ may be monitored by the microcontroller 322. Conversely, if the first hydrostatic pump/motor 306 on the ring gear has its displacement changed so that it rotates in the negative direction, the total inertia of the bus increases by a factor of 4.9 and this is applicable for speeds between 30 km/h and 50 km/h.

There will be some applications where it is preferable to store the energy mechanically, with the ring shaft stationary, for hills less than 16 m high and for speeds less than 60 km/h—the most likely speed range for suburban omnibuses operating on routes at reasonably high average speeds with undulating topography. Operation at other inertia ratios may not be as energy efficient but the microcontroller 322 could be programmed with an adaptive algorithm to optimise the method of storage and extraction of energy from the flywheel 303.

The torque relationship between the three shafts of the epicyclic gearbox 321 may be determined from the speed ratio of the sun gear 318 to the carrier 326 of 0.33, which are coupled to the flywheel 303 and tailshaft 315, respectively. Similarly the speed ratio of the ring gear 319 to the carrier 317 is 0.66, which ring gear is coupled to the first hydrostatic pump motor 306.

The operational modes of the hybrid propulsion system of the invention will now be described with reference to the speed map shown in FIG 1B. The speed map shows that the flywheel 303 operates always in the positive flywheel speed regime. The flywheel 303 is coupled to the sun shaft 318 and has a maximum speed of 5000 rpm. As the carrier shaft 326 is directly connected to the tailshaft 315 its speed is directly related to the vehicle speed. The maximum speed of the tailshaft is 3000 rpm at 103 km/h vehicle speed. The ring shaft is connected to the variable displacement pump/motor of the hydrostatic energy storage system, which pump/motor has a maximum speed of 4000 rpm both as a motor and as a pump in closed circuit operation.

(i) Acceleration Mode

This mode deals with acceleration of the vehicle from a standstill or to a higher desired speed or when additional torque is required for hill climbing.

(A) With flywheel precharge (normally available): in the speed range 0 to 40 km/hr, the fluid drive unit is used to transfer energy at a controlled rate from the flywheel to the bus via two paths. These are first a direct mechanical path from the carrier shaft of the epicyclic gear to the tail shaft 315 of the omnibus and secondly via the two hydrostatic machines to the input shaft of the automatic transmission and thus to the tail shaft. The vehicle is accelerated when the swash angle $A_{S1}$ of the first hydrostatic pump/motor 306 on the ring gear shaft 319 is increased, dependent on the accelerator position, with the swash angle $A_{S2}$ of the second hydrostatic pump/motor 307 attached to the first gear set 310 at maximum.

The vehicle accelerates through the gears along path S–T depicted on the speed map. The automatic transmission 314 is arranged such that gear changes occur at IC engine speeds of approximately 4000 rpm. At point S' the speed of the first hydrostatic pump/motor 306 changes sign (ie. the direction of rotation reverses) and, although the swash angle does not change, the machine changes from a pump to a motor with the torque remaining positive for drive.

At point T (a speed of 70 km/h) on the speed map, the first hydrostatic pump/motor 306 has reached its normal maximum operating speed of 3000 rpm. The swash angle $A_{S1}$ of the first hydrostatic pump/motor 306 is set near zero and the flywheel is maintained at a low speed of approximately 1500 rpm with an energy content of approximately 180 kJ. If the displacements of both hydrostatic machines are set so that the speed of each machine is the same, then the effective inertia of the bus is increased by 16%.

Vehicle speed in fourth gear can vary, such as along path U–V on the speed map, which has an effective inertia increase of 11%, with mechanical energy storage in the flywheel with the effective inertia dependent on the speed ratio of the hydrostatic drive or with hydraulic energy storage, either at constant or variable speed. There is little need for inertia increase at vehicle speeds above 60 km/h.

(B) With accumulator energy (but without flywheel precharge): the second hydrostatic machine 307 provides torque to the automatic transmission 314, which can be operated in third gear to 80 km/h and to 100 km/h in fourth gear. In this situation, power supplementation is provided by the IC engine 313 as required.

(ii) Cruise Mode (A) Vehicle inertia supplementation: with similar displacements of the two hydrostatic machines, the effective inertia of the bus has been increased by 16% at 80 km/hr. Short term power levels of 100 to 150 kW can be applied for small variations in speed.

For speeds in the range 40 to 60 km/h on undulating topography, the inertia of the bus can be increased by a factor of 2.4 by operating with the first hydrostatic pump/ motor 306 stationary by setting its swash angle to maximum and the angle of the second hydrostatic pump/motor 307 to near zero. Flywheel energy can be extracted by increasing the swash angle of the second hydrostatic pump/motor 307 so that it acts as a pump. To utilise both the accumulator 301 and flywheel 303 for energy storage, the swash angle of the second hydrostatic pump/motor 306 is set to the appropriate level and energy is transferred to the accumulator by opening the solenoid valve 305a (see FIG. 7).

Similarly, at a cruise speed of 60 km/hr and with the IC engine 313 manifold pressure $P_M$ reduced to less than 0.7 bar, energy can be stored in the flywheel 303 by transferring power via the hydraulic circuit, ie. with second hydrostatic machine 307 motoring and first hydrostatic machine 306 pumping thereby driving the flywheel to higher speeds. At vehicle speeds in excess of 60 km/h the accumulator 301 as well as the battery pack 304 can be utilized by the second hydrostatic machine 307 and the N132L electric machine coupled to the engine 313, respectively. The 70 litre accumulator can store 500 kJ and the second hydrostatic pump/motor 307 can utilize this energy at rates between 50 to 150 kW (depending on the vehicle speed and accumulator pressure $P_A$) whilst the electric motor 317 can deliver an additional 30–40 kW relatively efficiently from a 1500 kg battery pack 304.

(B) Hydrostatic power (limited energy availability): for speeds of 60 to 80 km/hr and a flywheel speed of 1500 rpm, the second hydrostatic pump/motor 307 can pump in order to store energy in the accumulator 301, with the hydrostatic pump 308 acting as the priming pump. Note that at these speeds the automatic transmission 314 is preferably in fourth gear with the torque converter locked up. The available power is of the order of 80 to 120 kW and the maximum energy storage is 500 kJ.

(C) Electric power (limited power): The battery pack 304 is capable of supplying 30 kW for a significant period of time and can be utilized in preference to the IC engine when the flywheel and hydrostatic systems have no available energy.

(iii) Deceleration Mode (A) Retardation from a vehicle speed range of 50 to 60 km/h: the swash angle $A_{S1}$ of the first hydrostatic pump/motor 306 goes to the maximum allowable at the current pump speed, or to a lesser amount should the demand for braking be small, and the automatic transmission 314 placed in neutral. The flywheel 303 speed increases along a trajectory W–X on the speed map and the hydraulic accumulator 301 pressure increases until the speed of the first hydrostatic pump/motor 306 reduces to zero. Epicyclic torque modulation is achieved by changing the swash angle $A_{S1}$ of the first hydrostatic pump/motor 306.

The trajectory is approximately normal to the ring shaft speed=0 locus on the gear speed map in FIG. 1B. If the accumulator pressure reaches its limit, the accumulator solenoid is left open and maximum torque is applied by the first hydrostatic pump/motor 306 as it maintains the accumulator at maximum pressure and discharges across an internal relief valve. However this situation would not occur in normal retardation and at this point the speed of the first hydrostatic pump/motor 306 is low and most of the energy from the omnibus is being stored very efficiently in the flywheel 303.

(B) Retardation from speeds below 50 km/h: when the first hydrostatic pump/motor 306 speed reaches zero, the swash angle is set at a maximum for maximum retarding force and the speed of the machine changes sign with the unit now acting as a motor without a change in sign of the displacement angle. The path taken is shown as X–Y in FIG. 1B and a significant amount of the available bus kinetic energy is transferred into the flywheel. Should the accumulator pressure fall to near minimum, the automatic transmission is put into gear and the swash angle $A_{S2}$ of the second hydrostatic pump/motor 307 is modulated to achieve the required pressure and torque on the first hydrostatic pump/motor 306 on the ring gear shaft. Thus an additional regenerative torque is applied by the second hydrostatic pump/motor 307 on the tail shaft.

(C) Retardation from speeds greater than 60 km/h: occurs due to the significant aerodynamic drag at such speeds, assisted by the electrical charging of the battery pack 304 by the motor 317. Energy can also be stored hydraulically in accumulator 301 by second hydrostatic machine 307 and hydrostatic pump 308, with a small contribution from first hydrostatic machine 306. The first hydrostatic machine is controlled at near maximum speed to increase the flywheel speed along a relatively horizontal trajectory, see FIG. 1B, than that shown in relation to lower speed regeneration along path W–X–Y.

(iv) Stationary Mode (A) Flywheel precharge: the load on the IC engine 313, since it is connected to the 56 cc variable displacement pump/motor 307, is controlled by the swash plate angles of both of the hydrostatic machines. Approximately 3.5 kW is available from the engine at no additional fuel consumption above that of the idle fuel consumption of 1.6 L/h. This represents an energy transfer of 3.5 kJ/s into the first hydrostatic pump/motor 306 for an expected 50 seconds to top up the flywheel energy from a previous stop. Generally speaking, idle charge is only used at bus stops and much higher power levels can be used for initial start up. The IC engine idle fuel consumption power of 3.5 kW is more than adequate to maintain the flywheel at peak speed of 5500 rpm.

(B) Accumulator charge: will similarly be provided using power from the IC engine 313 to drive the second hydrostatic machine 307 to pump and pressurise the accumulator 301.

(C) Battery charge: will generally be achieved using the mains supply, rather than a power unit internal to the hybrid propulsion system.

A hybrid propulsion system configured in accordance with the invention has a high degree of flexibility, as the above description of the various operating modes demonstrates. The energy storage capacity of the 70 litre accumulator is 500 kJ whilst that of the flywheel is 2 MJ. The size of the hydrostatic machines determines the torques and hence the rates of acceleration or retardation. However, the distribution of the energy into or out of the two energy storage means is relatively independent of the torque levels. Higher torques preferably utilize the flywheel in preference to the hydrostatic accumulator for energy storage.

Flywheel energy storage when the first hydrostatic pump/motor 306 is near zero speed is very efficient, as is the use of the flywheel when the pump/motor is held stationary and the automatic is locked up in fourth gear. When the first hydrostatic pump/motor speed is small, the power from the flywheel can be extracted mostly mechanically. If the most powerful method of flywheel energy extraction is desired, the flywheel energy can be extracted when the first hydrostatic pump/motor speed is positive by transferring the engine torque to the first hydrostatic pump/motor via the hydrostatic circuit. Thus all the flywheel power can be extracted at approximately 85% efficiency, but with a limit on the torque level as determined by the torque of the first hydrostatic pump/motor at maximum hydraulic pressure.

Idle fuel consumption of the IC engine 313 is utilized successfully to recharge the accumulator and/or the flywheel for very long stops (in excess of 60 seconds). The IC engine is preferably utilised at near maximum torque and whilst in the fourth gear provides for the average load, the transient power being made available either hydrostatically or by the flywheel. However, continuous high power can be achieved at 60 km/hr by changing the automatic transmission 314 to third gear or by using the battery pack 304 to supply the electric motor thereby providing around 30 kW.

The regenerative operations of the system use the hydrostatic machines and flywheel when the transfer of energy is most efficient and when the torque speed characteristics are matched. The fuel consumption is considerably improved, the IC engine always operating at an efficiency of greater than 22%, the hydrostatic machine in excess of 87% and the flywheel approximately 90%.

FIG. 8 shows a fourth embodiment of a hybrid propulsion system which shows certain modifications to the system of FIG. 6 and is particularly suited to high speed cruise operations, where it is important to substantially eliminate the losses associated with the second hydrostatic pump/motor 327. In this embodiment a modified gear set 328 is moved to the other side of the automatic transmission 314 from the IC engine 313, when compared to the first gear set 310 of the embodiment shown in FIG. 6. This is facilitated by the inclusion of a further gear for coupling the second hydrostatic pump/motor 327 and electric motor 317 to the tail shaft 315. The modified gear set 328 provides a gear ratio of 1.25:1 between the second hydrostatic machine 327 and the tail shaft 315 and, similarly, a gear ratio of 1.25:1 between the electric motor 317 and the second hydrostatic machine 327. This is a convenient arrangement when the speed changing transmission comprises an automatic gearbox and the losses associated with the internal torque converter, when not locked-up are eliminated. The first hydrostatic pump/motor 306 is a variable displacement machine A4VSO of 71 cc manufactured by Rexroth, whilst the second hydrostatic pump/motor 327 is also an A4VSO displacing up to 71 cc. Pump 308 in this embodiment is a high pressure fixed or variable displacement pump.

FIG. 9 shows a further modified fifth embodiment, relating to the second form of the invention, wherein the fluid drive unit (as shown in FIG. 8) is replaced by a second electric motor, preferably an AC machine 335, in the electric drive unit. The AC machine is coupled to the epicyclic gearbox 321 and thus indirectly to the flywheel 303 and tailshaft 315. Since AC electric motor drives have the capability of maintaining the same torque when changing from positive to negative speed and vice versa (similar to a hydrostatic machine), a four quadrant DC-AC inverter 334 and AC drive motor 335 of suitable size and torque capacity, such as 400 Nm or more from 0 to 4000 rpm, is connected to a ring gear of the epicyclic gearbox 321. The AC portion of the electric drive (335, 334) can also act as a generator for recharging the battery pack 304 and for supplying the DC motor 317 attached to the tail shaft 315, i.e. along path S–S' in FIG. 1B, while the ring gear speed is negative. For the rest of the trajectory, (i.e. positive speed path S'–T) the AC machine 335 acts as a motor to extract energy from the flywheel. The reverse situation applies for regeneration, i.e. the AC machine 335 acts as a generator along path W–X and as a motor along path X–Y. The DC motor 317 can also act as a generator for a portion of the W–X path in FIG. 1B.

The hybrid system of the fifth embodiment is relatively simple and has several advantages, including quiet operation, fewer components, and a smaller flywheel if a suitable high speed epicyclic gearbox is designed and manufactured. Since AC motors have a high speed capability, a higher speed rating for the ring gear could be beneficial in reducing the size of both motor and flywheel. The addition of a mechanical brake 333 on the flywheel 303 allows the use of the AC machine 335 for additional hill climbing or acceleration power once all of the energy has been extracted from the flywheel. However, the disadvantages include higher costs, the requirement for a higher speed epicyclic (for example 10,000 rpm ring speed) or an additional gear reduction, a charge discharge cycle on the battery pack for each acceleration and retardation, a brake on the ring shaft to reduce energy consumption during flywheel load levelling on undulating topography, a reduction in flywheel storage efficiency as the AC drive is not as efficient as the hydrostatic drive unit at near zero ring shaft speeds where the power demand for the bus is high, and although the AC drive would have lower losses when the vehicle is stationary and the flywheel is at high speed, the energy has to come from the battery. Other embodiments could use a DC drive in place of the AC drive on the epicyclic gearbox. In a trolley bus application, the electric drive could be supplied from a suitable overhead catenary for at least some of its operations.

The operation of the propulsion control means, which includes microcontroller 322 and memory unit 323 will now be described in relation to the control flow charts set out in FIGS. 10, 11A, 11B and 12, relevant to the fourth embodiment. This embodiment is to be understood as that shown in FIG. 6 when modified by the arrangement of propulsion units shown in FIG. 8. The control algorithms are embodiments of a method for controlling a hybrid propulsion system of the second form of the invention. The propulsion control means controls the drive units from which the power and energy is delivered to or from, and which path will be taken by said power or energy within the hybrid propulsion system. It will be appreciated that the methods are iterative and are responsive to changes in power demand, propulsion system state and vehicle operating mode, as described below. In the attached flow charts, the following abbreviations are conveniently utilised for the sake of brevity:

"pump/motor A"=first hydrostatic pump/motor 306, coupled to epicyclic gearbox 321;

"pump/motor B"=second hydrostatic pump/motor 327, coupled to first gear set 328; and "pump C"=hydrostatic pump 308.

FIG. 10 shows an overview flowchart for a typical control algorithm which has a primary input, namely the input signal $D_O$ from the operator of the vehicle in the form of a demand for positive power, meaning power delivered to the vehicle wheels. The demand may be to accelerate, to cruise, or a demand for braking of the vehicle (negative power), or a nil demand. Step 401 thus determines whether the demand is negative 402, none 403 (vehicle stopped) or positive 404. The present flowchart then deals with an appropriate control algorithm for the nil power demand 403. The connectors shown in relation to a positive power demand (1) and negative power demand (2) are continued on FIGS. 11A and 12, respectively.

(0) No Demand

With the vehicle stationary and no demand input $D_O$ from the driver, the flywheel rotational speed $S_F$ is determined 405. If not a maximum speed, the electric motor 317 is turned off and the second hydrostatic pump/motor 327 swash angle $A_{S2}$ is set to zero 406. The automatic gearbox 314 is then placed in neutral and the IC engine 313 idle power is used to increase (or maintain) the speed of the flywheel 303. This is achieved by transferring power via the hydraulic circuit consisting of the fixed displacement pump 308 connected directly to the IC engine and the variable displacement pump/motor 306 connected to the epicyclic gearbox 321 and thereby coupled to the flywheel 303.

If the flywheel is at maximum speed, the accumulator pressure $P_A$ is checked 409. If the accumulator is not full, the idle power of the IC engine can be used to charge 410 the accumulator by using the hydrostatic pump 308. If the flywheel is at maximum speed and the accumulator is full, the IC engine is set to idle (no load) 411, which is a "ail-safe condition". Subsequently all pump/motors are set to zero swash and the electric motor 317 is turned off 412.

(1) Positive Power Demand

FIGS. 11A and 11B show overview flowcharts for a typical control algorithm which is an embodiment of a method for controlling the hybrid propulsion system when there is a demand for drive, whether for cruise or acceleration, ie. a positive power requirement at the vehicle wheels. In some instances discussed below, the choice of which drive unit to use is described as being dependent on the propulsion system state. The system state is determined from a number of parameters, including the energy stored in each of the accumulator 301, the flywheel 303 and the battery pack 304, the speed of the vehicle and the speed of the IC engine, the hydrostatic and electric motors and the current vehicle operating mode which are obtained by the microcontroller 322. Based on this information, one or more of the drive units is selected to propel the vehicle. The power (or torque) generated by the drive units is also varied depending on the demand signal $D_O$ derived from the vehicle operator's console.

The first step is checking 413 the flywheel speed $S_F$ to see if there is energy in the flywheel that can be used to accelerate/drive the vehicle.

(a) Flywheel energy available: FIG. 11A deals with the algorithm used when there is flywheel energy available. If there is energy available, the speed of the first hydrostatic pump/motor 306 is checked 414 to see if it is positive or negative, refer to the speed map in FIG. 1B. During vehicle acceleration, the speed of the first pump/motor 306 will change from negative to positive as the vehicle speed increases and the flywheel speed decreases. The first hydrostatic machine 306 will operate as a pump at negative speed and a motor at positive speed without any change in swash angle $A_{S1}$. When pump/motor 306 is at zero speed, it is preferable to have maximum pressure in the accumulator 301 so that the stored energy can be used to drive the vehicle and extract further energy from the flywheel 303 as the vehicle accelerates.

If the speed (rotation) of the first hydrostatic machine 306 is negative (likely to occur with the vehicle at low speed and the flywheel at high speed), the machine operates as a pump 415 with the swash angle $A_{S1}$ dependent on the acceleration demand $D_O$. The oil from machine 306 can flow to either the second hydrostatic machine 327 operating as a motor and/or to the accumulator 301. The speed of the first machine 306 is checked 416, and if low and the energy in the accumulator is low, all of the energy will be transferred to the accumulator instead of being shared with the vehicle via the second hydrostatic pump/motor 327. This is achieved by setting the swash angle $A_{S2}$ of second pump/motor 327 to zero 417, as it will not be used. If the maximum swash angle of pump A is reached 418 and further acceleration is demanded by the driver, energy can be added from either the electric motor 317 or preferably the IC engine 313. The automatic gearbox 314 is then put into gear and the throttle $O_T$ on the IC engine opened 419 so that power is now being added from the IC engine. If the maximum desired engine power is reached and further power is being demanded by the driver 420, power can then be added electrically 421 by the electric motor.

If the first hydrostatic machine 306 is operating as a pump and the second hydrostatic machine 327 as a motor, with the accumulator control valve 305a open, oil will flow to the motoring machine 327 and the accumulator 301, at step 422. When the second hydrostatic machine 327 is at low speed, most of the oil from the pumping machine 306 will flow to the accumulator 301. As the speed of the second machine 327 increases, more oil will flow through it instead of going to the accumulator. If the maximum hydrostatic power is being transferred 423 and further acceleration is being demanded, energy can be added from the IC engine by putting the automatic into drive and increasing the IC engine throttle 424.

If the speed (rotation) of first pump/motor 306 is positive, it must operate as a motor to accelerate the vehicle 425. If there is energy in the accumulator 301, second pump/motor 327 will generally not be used 426 and the energy in the accumulator used 427 to drive the first motor 306, unless accumulator pressure is very high 428. The swash angle $A_{S1}$ of first pump/motor 306 will depend on acceleration demand $D_O$. If the maximum swash angle of first pump/motor 306 is reached 429 and further acceleration is demanded by the driver, energy can be added from either the electric motor or the IC engine. The automatic gearbox is then put into gear and the throttle on the IC engine opened so that power is now being added 419 from the IC engine. If the maximum desired engine power is reached and further power is being demanded by the driver, power can then be added 421 electrically.

If there is no energy in the accumulator to drive the first pump/motor 306, the second hydrostatic machine 327 operates 430 as a pump in a closed circuit mode with the first pump/motor. The automatic gearbox is put into drive and the IC engine throttle increased 431. Power from the IC engine can then go either directly to the tailshaft to drive the vehicle or to second pump/motor 327 and first pump/motor 306 to extract energy from the flywheel to accelerate or drive the vehicle. Power may also be added 432 by the electric motor 317 as required.

(b) Flywheel energy is not available: FIG. 11B deals with the situation where flywheel energy is not available, continuing from FIG. 11A. If there is no energy available in the flywheel, first pump/motor 306 is set to zero swash angle and is not operated 434, subsequent to obtaining 433 the system state. The states of charge of the battery pack 304 and the accumulator 301 are considered and the choice of unit for acceleration determined 435. If there is energy in the accumulator, second hydrostatic machine 327 is operated 436 as a motor to accelerate the vehicle in preference to the use of the electric motor 317. Thus the swash angle $A_{S2}$ is varied 437 depending on the acceleration demand. If the swash angle is not at maximum 438, the idle power of the IC engine 313 is transferred 439 to the vehicle via hydrostatic pump 308 which adds to the oil flow helping to maintain the pressure of the accumulator 301. If the maximum swash is reached at step 438 and further acceleration is demanded, the automatic gearbox is placed into drive and the throttle of the IC engine increased 440. If the maximum desired engine power is reached 441 and further power is being demanded by the driver, power can then be added 442 by the electric drive unit if available.

If there is no energy in the accumulator 301, energy is supplied 443 from the battery pack 304 and the IC engine 313. The accumulator valve 305a is closed and the second pump/motor 327 set to zero swash as it is not utilised 444. Depending on the state of charge 445 of the batteries, energy is added 446 either from the electric motor or the IC engine or both together. If the state of charge of the batteries is high, the electric motor is used first. If maximum electrical power is being applied, the IC engine is then used to supplement the power. If the state of charge of the batteries is low, the IC engine is used first with power from the batteries being added if additional power is required. The power from the batteries will be limited if their state of charge is very low.

(2) Negative Power Demand

FIG. 12 shows an overview flowchart for a typical control algorithm which is an embodiment of a method for controlling the hybrid propulsion system when there is a demand for braking, ie. a negative power requirement at the vehicle wheels. In negative power (braking) operations, energy can be stored either in the flywheel 303, the hydrostatic accumulator 301 or the battery pack 304. Initially the speed of the flywheel 303 is tested 450.

(a) Flywheel is not at maximum speed: If the flywheel is not at maximum speed, energy can be stored in the flywheel. This is controlled by operating first hydrostatic machine 306 as a pump if its speed is positive or as a motor if its speed is negative. Accordingly the speed (rotation) of the first pump/motor 306 is checked 451 and, if positive (typically when the vehicle is at high speed and the flywheel is at a low speed), first hydrostatic machine 306 is operated 452 as a pump. The oil flow will charge the accumulator 301 and energy will also be stored in the flywheel 303. The swash angle $A_{S1}$ of the machine 306 will depend on the braking demand from the driver.

The swash angle is monitored 453 and, if not at a maximum, second hydrostatic machine 327 and the electric motor 317 need not be used 454 since the first pump/motor 306 is providing sufficient braking for the vehicle. The IC engine 313 will be at idle with the gearbox 314 in neutral (the idle fuel power could be used with hydrostatic pump 308 for an additional charge into the accumulator). If the swash angle of pump/motor 306 has reached a maximum and further braking is demanded, energy can be stored in either the accumulator by using the second hydrostatic machine 327 as a pump or in the batteries by using the electric machine 317 as a generator. Accordingly the system state is assessed 455 and a regenerative mode determined 456 on this basis as set out briefly in steps 457 and 458 of FIG. 12. For example if the vehicle speed is high, the second hydrostatic machine 327 will generally not be used and regeneration energy will go into the batteries 304. However, for high braking demands, both second hydrostatic machine 327 and the electric machine 317 could be used. If the vehicle speed is low, or the electric machine speed were not high enough to store energy in the batteries, the electric machine will not be used and second hydrostatic machine 327 operated as a pump to store energy in the accumulator 301.

If the speed of pump/motor 306 is negative (typically when the vehicle is at low speed and the flywheel is at medium to high speeds), the first hydrostatic machine 306 must operate 459 as a motor. The electric machine 317 will not be used 460 for regeneration as its speed will generally be too low to generate sufficient voltage to charge the battery pack. Braking is regulated 463 by varying the swash angles of first pump/motor 306 and second pump/motor 327 (first hydrostatic machine operating as a motor and second hydrostatic machine operating as a pump). This can be carried out in either closed circuit mode (without the accumulator) or open circuit mode (with the accumulator). This will be determined by the accumulator energy state 461, the relative speeds of pump/motor 306 and pump/motor 327 and the torque demand from the driver. If the system is operating with the accumulator, the IC engine 313 can add power 462 to the accumulator via hydrostatic pump 308. If operating without the accumulator the IC engine will generally be set to idle.

(b) Flywheel at maximum speed: If the flywheel is at maximum speed, the swash angle of the first hydrostatic machine 306 is set 464 to zero and no energy is transferred to the flywheel 303. Regeneration can only occur into the batteries or the accumulator, although it is unlikely that regeneration into the batteries will be possible as the vehicle speed (hence electric motor speed) will be low as the flywheel should normally be at maximum speed when the vehicle is near zero speed, except in the case of a long downhill run.

Braking energy can be stored in either the accumulator 301 by using second hydrostatic machine 327 as a pump or into the batteries by using the electric motor/generator as a generator. Again the system state is assessed 465 and a regenerative mode determined 466 on this basis. If the vehicle speed is high (unlikely if the flywheel is at maximum speed), second hydrostatic machine 327 will generally not be used and regeneration energy will be transferred into the batteries. If the vehicle speed is low, or the electric motor speed would not be high enough to store energy in the batteries, the electric motor (unless an AC machine) will not be used and second hydrostatic machine 327 operated as a pump to store energy in the accumulator.

The propulsion system of the embodiments of the second form of the invention have several advantages over prior art arrangements for transit applications. When very high accelerations are demanded by the driver, the flywheel, accumulator, ICE and battery can all be used and brought into operation sequentially as power demand increases or as the available energy in the flywheel and the accumulator decrease. This situation arises especially when the speed exceeds 40 km/hr where high power is required. Accumulator energy, if available, can be used at any bus speed to reduce the energy demands on the ICE or the battery. The electric motor and battery pack enable electric power to be used, preferably when the motor speed corresponds to the medium to high vehicle speed range. The propulsion control system is preferably arranged to ensure that normally battery power would only be used when the torque converter was locked. Regeneration can be accomplished at all speeds in excess of 50 km/hr at 30–40 kW power levels. It can also be used in flywheel regeneration mode if the speed of the first hydrostatic machine is positive and the accumulator is full.

The component sizes mentioned in the specification in relation to the various drive units for the second form of the invention are for a 10 to 12 tonne omnibus. Components for other bus sizes may be scaled linearly in accordance with anticipated GVM if the normal maximum speed is 100 km/h. The acceleration performance scales on the ratio of maximum bus kinetic energy and a bus of nearly twice the mass at 75 km/h has approximately the same energy as the smaller bus at 100 km/h.

The propulsion system of the invention is believed to be the first to be proposed with up to 4 different energy sources available for vehicle propulsion. The propulsion system will perform in all possible transit omnibus operating conditions in any major urban area. The versatility of the system is such that when operating in less demanding environments some components of the system need not be installed. These environments include lower maximum speeds, lower acceleration demands, level roads, or where adequate high rate battery charging stations are available. This versatility reduces the capital cost of the vehicle whilst meeting operational requirements with minimum energy consumption. It also enables the use of the preferred and most efficient source of energy and a balance between electricity from the grid or fluid (liquid or gaseous) fuel for the IC engine.

This modular concept for the propulsion system can be further demonstrated by the following example configurations:

(I) Battery-hydrostatic accumulator-flywheel system for the CBD where rapid charging facilities are available;

(II) Fluid fuel (IC engine)-flywheel system for long distance omnibus operations, without the use of the battery or the accumulator; or (III) Fluid fuel (IC engine)-flywheel-battery (with AC drive) but no hydrostatic machines or accumulator.

Throughout the specification the aim has been to describe the preferred embodiments of the invention without limiting the invention to any one aspect, form or embodiment described herein.

What is claimed is:

1. A hybrid propulsion system for use in vehicle operations, said propulsion system comprising:
    (a) a power splitting mechanical transmission for coupling to a final drive of the vehicle;
    (b) a first drive unit arranged for regenerative operation and coupled to the power splitting mechanical transmission;
    (c) a second drive unit arranged for regenerative operation and coupled, independently of said first drive unit, to the power splitting mechanical transmission;
    (d) a non-regenerative third drive unit arranged in parallel to said power splitting mechanical transmission, for coupling to the final drive; and
    (e) propulsion control means for coordinating operation of the drive units in accordance with a plurality of predetermined modes corresponding to a driving cycle of said vehicle;
    wherein each of the first, second and third drive units includes a different type of energy storage means.

2. A hybrid propulsion system as claimed in claim 1 wherein the power splitting mechanical transmission includes an epicyclic gearbox having a ring gear on a first shaft, a sun gear on a second shaft and a planetary gear carrier assembly on a third shaft.

3. A hybrid propulsion system as claimed in claim 1 wherein the propulsion control means includes a microcontroller interfaced to a series of status transducers and a series of control means, which status transducers and control means are associated with respective components of the propulsion system.

4. A hybrid propulsion system as claimed in claim 3 wherein the microcontroller includes memory means for storing therein signals received from the status transducers associated with each drive unit, which status signals are indicative of the operational state of respective drive units, which memory means also stores data indicative of corresponding command signals applied to the control means for the drive units; whereby the stored status signal data and the stored command signal data are utilized either for deterministic or adaptive control of the hybrid propulsion system.

5. A hybrid propulsion system for use in vehicle operations, said propulsion system comprising:
    (a) a power splitting mechanical transmission for coupling to a tailshaft of the vehicle, wherein the power splitting mechanical transmission includes an epicyclic gearbox;

(b) a first drive unit arranged for regenerative operation and coupled to the power splitting mechanical transmission;

(c) a second drive unit arranged for regenerative operation and coupled, independently of said first drive unit, to the power splitting mechanical transmission;

(d) a non-regenerative third drive unit coupled, in parallel to said power splitting mechanical transmission, to the tailshaft; and (e) propulsion control means for coordinating operation of the drive units in accordance with a plurality of predetermined modes corresponding to a driving cycle of said vehicle;

wherein each of the first, second and third drive units includes a different type of energy storage means and said propulsion system further including:

(A) a ring gear of the epicyclic gearbox arranged for coupling to the tailshaft;

(B) the first drive unit being coupled to a sun gear of the epicyclic gearbox;

(C) the second drive unit being coupled to a planetary gear carrier assembly of the epicyclic gearbox; and (D) the third drive unit being coupled to the tailshaft via a speed changing transmission;

whereby the epicyclic gearbox delivers torque to the tailshaft for propelling the vehicle or receives torque from the tailshaft for retarding the vehicle.

6. A hybrid propulsion system as claimed in claim 5 wherein:

the first drive unit includes an electrical energy storage means and an associated electrical energy conversion means;

the second drive unit includes a fluid pressure storage means and an associated fluid pressure energy conversion means; and the third drive unit includes a chemical energy storage means and an associated combustion engine.

7. A hybrid propulsion system as claimed in claim 6 wherein the predetermined modes coordinated by the propulsion control means include:

(i) an acceleration mode, wherein the fluid pressure energy conversion means or the electrical energy conversion means supplies power to the tailshaft, supplemented by power from the combustion engine as required;

(ii) a cruise mode, wherein the electrical energy conversion means supplies power to the tailshaft, supplemented by power from the combustion engine as required;

(iii) a deceleration mode, wherein each of the fluid pressure energy conversion means and the electrical energy conversion means are operated regeneratively to recover power from the tailshaft and supply, respectively, the fluid pressure storage means and the electrical energy storage means; and (iv) a stationary mode, wherein a selected drive unit supplies power for replenishing the fluid pressure storage means as required.

8. A hybrid propulsion system for use in vehicle operations, said propulsion system comprising:

(a) a power splitting mechanical transmission for coupling to a tailshaft of the vehicle, wherein the power splitting mechanical transmission includes an epicyclic gearbox;

(b) a first drive unit arranged for regenerative operation and coupled to the power splitting mechanical transmission;

(c) a second drive unit arranged for regenerative operation and coupled, independently of said first drive unit, to the power splitting mechanical transmission;

(d) a non-regenerative third drive unit coupled, in parallel to said power splitting mechanical transmission, to the tailshaft; and (e) propulsion control means for coordinating operation of the drive units in accordance with a plurality of predetermined modes corresponding to a driving cycle of said vehicle;

wherein each of the first, second and third drive units includes a different type of energy storage means and said propulsion system further includes:

(A) a planetary gear carrier assembly of the epicyclic gearbox being arranged for coupling to the tailshaft;

(B) the first drive unit being coupled to a ring gear of the epicyclic gearbox;

(C) the second drive unit being coupled to a sun gear of the epicyclic gearbox; and (D) the third drive unit being coupled to the tailshaft via a speed changing transmission; whereby the epicyclic gearbox delivers torque to the tailshaft for propelling the vehicle or receives torque from the tailshaft for retarding the vehicle.

9. A hybrid propulsion system as claimed in claim 8 wherein:

the first drive unit includes a fluid pressure storage means and an associated fluid pressure energy conversion means;

the second drive unit includes a mechanical energy storage means; and the third drive unit includes a chemical energy storage means and an associated combustion engine.

10. A hybrid propulsion system as claimed in claim 7 further including a fourth drive unit coupled to the planetary gear carrier assembly, which fourth drive unit includes a second fluid pressure energy conversion means associated with the fluid pressure storage means.

11. A hybrid propulsion system as claimed in claim 9 wherein the predetermined modes coordinated by the propulsion control means include:

(i) an acceleration mode, wherein the mechanical energy storage means supplies power to the tailshaft, controlled by power either supplied to or sourced from the fluid pressure energy conversion means and supplemented by power from the combustion engine as required;

(ii) a cruise mode, wherein the combustion engine supplies power to the tailshaft, supplemented by power from the mechanical energy storage means controlled by the fluid pressure energy conversion means as required;

(iii) deceleration mode, wherein fluid pressure energy conversion means is operated to control regeneration of power from the tailshaft to supply either the mechanical energy storage means or the fluid pressure storage means; and (iv) a stationary mode, wherein a selected drive unit supplies power for replenishing the mechanical energy storage means or the fluid pressure storage means as required.

12. A hybrid propulsion system as claimed in claim 8 wherein:

the first drive unit includes an electrical energy storage means and an associated electrical energy conversion means;

the second drive unit includes a mechanical energy storage means; and the third drive unit includes a chemical energy storage means and an associated combustion engine.

13. A hybrid propulsion system as claimed in claim 10 wherein:

the first drive unit includes an electrical energy storage means and an associated electrical energy conversion means;

the second drive unit includes a mechanical energy storage means;

the third drive unit includes a chemical energy storage means and an associated combustion engine;

a fourth drive unit coupled to the planetary gear carrier assembly; and the fourth drive unit includes a second electrical energy conversion means associated with the electrical energy storage means.

14. A hybrid propulsion system as claimed in claim 12 wherein the predetermined modes coordinated by the propulsion control means include:

(i) an acceleration mode, wherein the mechanical energy storage means supplies power to the tailshaft, controlled by power either supplied to or sourced from the electrical energy conversion means and supplemented by power from the combustion engine as required;

(ii) a cruise mode, wherein the combustion engine supplies power to the tailshaft, supplemented by power from the mechanical energy storage means controlled by the electrical energy conversion means as required;

(iii) a deceleration mode, wherein electrical energy conversion means is operated to control regeneration of power from the tailshaft to supply either the mechanical energy storage means or the electrical energy storage means; and (iv) a stationary mode, wherein a selected drive unit supplies power for replenishing the mechanical energy storage means or the electrical energy storage means as required.

15. A hybrid propulsion system as claimed in either claim 6 or claim 9 wherein the fluid pressure storage means includes at least one hydrostatic accumulator and the fluid pressure energy conversion means includes at least one hydrostatic pump/motor and an auxiliary hydrostatic machine coupled to the combustion engine.

16. A hybrid propulsion system as claimed in either claim 6 or claim 12 wherein the electrical energy storage means includes a battery pack, whilst the electrical energy conversion means includes a rotary electric machine and an auxiliary rotary electric machine coupled to the combustion engine.

17. A hybrid propulsion system as claimed in claim 13 wherein the electrical storage means includes a battery pack and/or super capacitor, whilst the second electrical energy conversion means includes a rotary electric machine and a solid state power converter.

18. A hybrid propulsion system as claimed in claim 9 wherein the mechanical energy storage means includes a kinetic energy storage means including at least one flywheel.

19. A hybrid propulsion system as claimed in any one of claims 6, 9, or 12 wherein the chemical energy storage means includes at least one fluid fuel storage tank for storing liquid or gaseous fuel, and the combustion engine is a either a spark ignition or a compression ignition internal combustion engine.

20. A hybrid propulsion system as claimed in any one of claims 2, 5, or 8 wherein at least one shaft of the epicyclic gearbox is coupled to a brake means.

21. A hybrid propulsion system as claimed in either claim 5 or claim 8 wherein the speed changing transmission includes a clutch and a hydrodynamic torque converter.

22. A hybrid propulsion system as claimed in claim 5 wherein the speed changing transmission includes an automatic transmission, with a lock-up hydrodynamic torque converter.

23. A method for controlling a hybrid propulsion system for a vehicle, which propulsion system includes at least two drive units arranged for regenerative operation and coupled to a power splitting mechanical transmission independently of each other, which mechanical transmission is coupled, in parallel with a non-regenerative third drive unit, to a final drive of the vehicle and wherein each of the first, second and third drive units includes a different type of energy storage means, said method including the steps of:

determining current state of the propulsion system by monitoring status of each drive unit, including respective operating speeds and energy storage levels;

receiving a demand signal indicative of desired vehicle motion; and if the demand signal indicates that negative wheel power for braking the vehicle is desired:
operating any of the regenerative drive units regeneratively in accordance with current system state; or
if the demand signal indicates that positive wheel power for cruise or acceleration is desired:
operating one or more of the drive units propulsively in accordance with current system state; or
if the demand signal indicates that no wheel power is desired, the vehicle being stationary:
operating selected ones of the drive units for replenishing energy storage means associated with the regenerative drive units;

which steps are repeatedly iterated in order to control the propulsion system with an optimum trajectory to a desired system state indicated by the demand signal.

* * * * *

UNITED STATES PATENT AND TRADEMARK OFFICE
CERTIFICATE OF CORRECTION

PATENT NO.   : 6,170,587 B1
DATED        : January 9, 2001
INVENTOR(S)  : Keith Joseph Bullock It is certified that error appears in the above-identified patent and that said Letters Patent is hereby corrected as shown below:

Column 1,
Line 16, after "conveniently" change "categorised" to -- catergorized --
Line 26, after "Table 1" delete "(overpage)"
Line 29, after "per" change "kilometre" to -- kilometer --
Line 44, after "engine" change "fuelled" to -- fueled --

Column 2,
Lines 8-9, in both instances after "Important" delete "Essential"
Lines 8-9, in both instances after "Not" insert "Essential"
Line 25, after "loaded 12" change "metre" to -- meter --
Line 41, after "15" change "tonne" to -- ton --

Column 5,
Line 29, after "(CVT)," change "ie." to -- ie., --

Column 6,
Line 23, before "another" delete "a"
Line 26, before "yet" delete "a"
Line 47, before "third drive" delete "non-regenerative"

Column 15,
Line 38, after "ratio" delete "in the"

Column 16,
Line 6, after "current $I_A$" insert a period
Line 42, after "example" insert a comma Column 18,
Line 32, after "angle $A_s$" delete the comma
Line 34, before "and acceleration" change "PA" to -- $P_A$ --

Column 20,
Line 13, before "optimum" change "that" to -- than --
Line 26, after "accumulator" change "with" to -- will --
Line 36, before "components" change "electromechanical" to -- electro-mechanical --

Column 22,
Line 48, before "this embodiment" delete "the"

UNITED STATES PATENT AND TRADEMARK OFFICE
CERTIFICATE OF CORRECTION

PATENT NO. : 6,170,587 B1
DATED : January 9, 2001
INVENTOR(S) : Keith Joseph Bullock It is certified that error appears in the above-identified patent and that said Letters Patent is hereby corrected as shown below:

Column 27,
Line 9, change "tail shaft" to -- tailshaft --

Column 30,
Line 10, after "which is a" change ""ail-safe" to -- "fail-safe --

Column 35,
Line 17, after "gearbox" insert -- being --

Column 38,
Line 10, before "either" delete "a"

Signed and Sealed this

Twenty-eighth Day of May, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,170,587 B1
DATED : January 9, 2001
INVENTOR(S) : Keith Joseph Bullock It is certified that error appears in the above-identified patent and that said Letters Patent is hereby corrected as shown below:

Column 1,
Line 16, after "conveniently" change "categorised" to -- catergorized --
Line 26, after "Table 1" delete "(overpage)"
Line 29, after "per" change "kilometre" to -- kilometer --
Line 44, after "engine" change "fuelled" to -- fueled --

Column 2,
Lines 8-9, in both instances after "Important" delete "Essential"
Lines 8-9, in both instances after "Not" insert "Essential"
Line 25, after "loaded 12" change "metre" to -- meter --

Column 5,
Line 29, after "(CVT)," change "ie." to -- ie., --

Column 6,
Line 23, before "another" delete "a"
Line 26, before "yet" delete "a"

Column 15,
Line 38, after "ratio" delete "in the"

Column 16,
Line 6, after "current $I_A$" insert a period
Line 42, after "example" insert a comma Column 18,
Line 32, after "angle $A_s$" delete the comma
Line 34, before "and acceleration" change "PA" to -- $P_A$ --

Column 20,
Line 13, before "optimum" change "that" to -- than --
Line 26, after "accumulator" change "with" to -- will --
Line 36, before "components" change "electromechanical" to -- electro-mechanical --

Column 22,
Line 48, before "this embodiment" delete "the"

UNITED STATES PATENT AND TRADEMARK OFFICE
CERTIFICATE OF CORRECTION

PATENT NO. : 6,170,587 B1
DATED : January 9, 2001
INVENTOR(S) : Keith Joseph Bullock It is certified that error appears in the above-identified patent and that said Letters Patent is hereby corrected as shown below:

Column 27,
Line 9, change "tail shaft" to -- tailshaft --

Column 30,
Line 10, after "which is a" change ""ail-safe" to -- "fail-safe --

Column 35,
Line 17, after "gearbox" insert -- being --

Column 38,
Line 10, before "either" delete "a"

This certificate supersedes Certificate of Correction issued July 23, 2002.

Signed and Sealed this

Twenty-seventh Day of August, 2002

Attest:

JAMES E. ROGAN
Attesting Officer     Director of the United States Patent and Trademark Office